United States Patent
Zhang et al.

(10) Patent No.: US 10,637,748 B2
(45) Date of Patent: Apr. 28, 2020

(54) METHOD AND APPARATUS FOR ESTABLISHING INTERFACE BETWEEN VNFMS, AND SYSTEM

(71) Applicant: HUAWEI TECHNOLOGIES CO., LTD., Shenzhen, Guangdong (CN)

(72) Inventors: Kai Zhang, Shanghai (CN); Lan Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 15/719,763

(22) Filed: Sep. 29, 2017

(65) Prior Publication Data
US 2018/0069768 A1 Mar. 8, 2018

Related U.S. Application Data

(63) Continuation of application No. PCT/CN2015/075417, filed on Mar. 30, 2015.

(51) Int. Cl.
*H04L 12/24* (2006.01)
*G06F 9/50* (2006.01)

(52) U.S. Cl.
CPC ...... *H04L 41/5022* (2013.01); *H04L 41/0893* (2013.01); *H04L 41/0896* (2013.01); *H04L 41/5041* (2013.01); *G06F 9/5077* (2013.01); *H04L 41/042* (2013.01); *H04L 41/0886* (2013.01)

(58) Field of Classification Search
CPC .................................................. H04L 41/5022
See application file for complete search history.

(56) References Cited

U.S. PATENT DOCUMENTS

| 8,856,786 B2 | 10/2014 | Kikuchi et al. | |
| 2006/0193330 A1* | 8/2006 | Ishihara | H04L 12/4675 370/395.53 |
| 2008/0049741 A1* | 2/2008 | Wirtanen | H04W 48/14 370/389 |
| 2012/0003958 A1* | 1/2012 | Hossain | H04L 63/101 455/411 |
| 2014/0086177 A1 | 3/2014 | Adjakple et al. | |
| 2016/0127333 A1* | 5/2016 | Sood | H04L 63/06 380/44 |

(Continued)

FOREIGN PATENT DOCUMENTS

| CN | 101541093 A | 9/2009 |
| CN | 104050045 A | 9/2014 |

(Continued)

OTHER PUBLICATIONS

ETSI GS NFV 002 V1.1.1, "Network Functions Virtualisation (NFV); Architectural Framework", Oct. 2013, XP55450721A, 22 pgs.

(Continued)

*Primary Examiner* — John D Blanton
(74) *Attorney, Agent, or Firm* — Kilpatrick Townsend & Stockton LLP

(57) ABSTRACT

Embodiments of the present invention provide a method and an apparatus for establishing an interface between VNFMs, and a system, and relate to the field of communications technologies, so as to improve efficiency of communication between the VNFMs to some extent.

17 Claims, 8 Drawing Sheets

(56) References Cited

U.S. PATENT DOCUMENTS

2016/0188527 A1* 6/2016 Cherian .................. H04L 45/74
              709/212
2016/0212214 A1* 7/2016 Rahman ............. H04L 67/1097
2017/0031623 A1   2/2017 Gong et al.

FOREIGN PATENT DOCUMENTS

CN      104137482 A    11/2014
CN      104170323 A    11/2014
EP      3 119 034 A1    1/2017

OTHER PUBLICATIONS

ETSI GS IVA 009 V0.1.1, "Network Function Virtualization (NFV) Management and Orchestration; Report on Architectural Options," Feb. 2015, XP14252477A, 16 pgs.
Orange et al., "Generic VNFM deployment option," NFVIFA#4-F2F Prague, Feb. 2015, XP14260264A, 4 pgs.
ETSI GS NFV-MAN 001 V1.1.1, "Network Functions Virtualisation (NFV); Management and Orchestration," Dec. 2014, XP14235740A, 184 pgs.
3GPP TR 32.842 V1.0.0, "3rd Generation Partnership Project; Technical Specification Group Services and System Aspects; Telecommunication management; Study on network management of virtualized networks (Release 13)," XP50965021A, Mar. 2015, 48 pgs.
Extended European Search Report dated Feb. 21, 2018, in corresponding European Patent Application No. 15886847.1, 11 pgs.
International Search Report dated Dec. 29, 2015 in corresponding International Patent Application No. PCT/CN2015/075417.
International Search Report dated Dec. 29, 2015 in corresponding International Patent Application No. PCT/CN2015/075417, 4 pp.

* cited by examiner

METHOD AND APPARATUS FOR ESTABLISHING INTERFACE BETWEEN VNFMS, AND SYSTEM

CROSS-REFERENCE TO RELATED APPLICATIONS

This application is a continuation of International Application No. PCT/CN2015/075417, filed on Mar. 30, 2015, the disclosure of which is hereby incorporated by reference in its entirety.

TECHNICAL FIELD

The present invention relates to the field of communications technologies, and in particular, to a method and an apparatus for establishing an interface between VNFMs, and a system.

BACKGROUND

With rapid development of virtualization technologies, network function virtualization (English: network function virtualization, NFV for short) gradually attracts people's attention. In an NFV system, an instance of a VNF can run on a general-purpose physical device by implementing instantiation (English: instantiation) of the virtualized network function (English: virtualized network function, VNF for short), so that a function of a dedicated network element device in a network is implemented by using the general-purpose physical device.

In the prior art, one NFV system may include function nodes, such as a network function virtualization orchestrator (English: network function virtualization orchestrator, NFVO for short) and at least one virtualized network function manager (English: virtualized network function manager, VNFM). There is a communication interfacecommunication interface between each VNFM and the NFVO in the NFV system. When a VNFM in the NFV system needs to communicate with another VNFM in the NFV system, the VNFM may send to-be-sent data to the NFVO, and the NFVO forwards the to-be-sent data to the another VNFM, that is, the NFVO assists in completing communication between two or more VNFMs.

In the NFV system, because completion of communication between VNFMs requires assistance of the NFVO, efficiency of communication between the VNFMs is relatively low.

SUMMARY

The present invention provides a method and an apparatus for establishing an interface between VNFMs, and a system, so as to improve efficiency of communication between the VNFMs to some extent.

To achieve the foregoing objective, the following technical solutions are adopted in the present invention:

According to a first aspect, the present invention provides a method for establishing an interface between VNFMs, including:

receiving, by a first VNFM, an interface establishment request message sent by a second VNFM, where the interface establishment request message is used to request to establish a communication interface between the first VNFM and the second VNFM;

determining, by the first VNFM according to the interface establishment request message and an interface establishment policy of the first VNFM, whether to allow establishment of the communication interface; and when the first VNFM determines to allow establishment of the communication interface, sending, by the first VNFM, an interface establishment response message to the second VNFM, where the interface establishment response message is used to indicate that the communication interface is successfully established.

In a first possible implementation of the first aspect, the interface establishment policy of the first VNFM includes a maximum quantity of communication interfaces that are allowed by the first VNFM to be established; and the determining, by the first VNFM according to the interface establishment request message and an interface establishment policy of the first VNFM, whether to allow establishment of the communication interface includes:

determining, by the first VNFM according to the interface establishment request message, whether a quantity of established communication interfaces of the first VNFM is less than the maximum quantity of communication interfaces that are allowed by the first VNFM to be established; and determining, by the first VNFM, to allow establishment of the communication interface, when the quantity of established communication interfaces of the first VNFM is less than the maximum quantity of communication interfaces that are allowed by the first VNFM to be established; or determining, by the first VNFM, not to allow establishment of the communication interface, when the quantity of established communication interfaces of the first VNFM is equal to the maximum quantity of communication interfaces that are allowed by the first VNFM to be established.

With reference to the first possible implementation of the first aspect, in a second possible implementation, the interface establishment policy of the first VNFM further includes a priority relationship between VNFMs, and the priority relationship is used by the first VNFM to establish a communication interface between the first VNFM and another VNFM; and the determining, by the first VNFM, not to allow establishment of the communication interface, when the quantity of established communication interfaces of the first VNFM is equal to the maximum quantity of communication interfaces that are allowed by the first VNFM to be established includes:

when the quantity of established communication interfaces of the first VNFM is equal to the maximum quantity of communication interfaces that are allowed by the first VNFM to be established, obtaining, by the first VNFM, a priority of the second VNFM;

determining, by the first VNFM according to the priority of the second VNFM, a priority corresponding to the second VNFM in the priority relationship;

determining, by the first VNFM, whether the priority corresponding to the second VNFM in the priority relationship is higher than a priority corresponding to a third VNFM in the priority relationship, where the third VNFM is a VNFM that is corresponding to a lowest priority in the priority relationship and that is in VNFMs that have established a communication interface with the first VNFM; and when the first VNFM determines that the priority corresponding to the second VNFM in the priority relationship is higher than the priority corresponding to the third VNFM in the priority relationship, determining, by the first VNFM, to allow establishment of the communication interface; or when the first VNFM determines that the priority corresponding to the second VNFM in the priority relationship is lower than the priority corresponding to the third VNFM in the priority relationship, determining, by the first VNFM, not to allow establishment of the communication interface.

With reference to the first aspect, in a third possible implementation, the interface establishment policy of the first VNFM includes a maximum quantity of communication interfaces that are allowed by the first VNFM to be established and a first list, the first list includes at least one of a blacklist or a whitelist, the blacklist includes an identity of a VNFM that is not allowed by the first VNFM to establish an interface with the first VNFM, and the whitelist includes an identity of a VNFM that is allowed by the first VNFM to establish an interface with the first VNFM, and the interface establishment request message carries an identity of the second VNFM; and the determining, by the first VNFM according to the interface establishment request message and an interface establishment policy of the first VNFM, whether to allow establishment of the communication interface includes:

obtaining, by the first VNFM, the identity of the second VNFM that is carried in the interface establishment request message; and when the first list includes at least the whitelist and the whitelist includes the identity of the second VNFM, determining, by the first VNFM, to allow establishment of the communication interface; or when the first list includes at least the blacklist and the blacklist includes the identity of the second VNFM, determining, by the first VNFM, not to allow establishment of the communication interface; or when the first list does not include the identity of the second VNFM, determining, by the first VNFM, whether a quantity of established communication interfaces of the first VNFM is less than the maximum quantity of communication interfaces that are allowed by the first VNFM to be established; and determining, by the first VNFM, to allow establishment of the communication interface, when the quantity of established communication interfaces of the first VNFM is less than the maximum quantity of communication interfaces that are allowed by the first VNFM to be established; or determining, by the first VNFM, not to allow establishment of the communication interface, when the quantity of established communication interfaces of the first VNFM is equal to the maximum quantity of communication interfaces that are allowed by the first VNFM to be established.

With reference to the third possible implementation of the first aspect, in a fourth possible implementation, the interface establishment policy of the first VNFM further includes a priority relationship between VNFMs, and the priority relationship is used by the first VNFM to establish a communication interface between the first VNFM and another VNFM; and the determining, by the first VNFM, not to allow establishment of the communication interface, when the quantity of established communication interfaces of the first VNFM is equal to the maximum quantity of communication interfaces that are allowed by the first VNFM to be established includes:

when the quantity of established communication interfaces of the first VNFM is equal to the maximum quantity of communication interfaces that are allowed by the first VNFM to be established, obtaining, by the first VNFM, a priority of the second VNFM;

determining, by the first VNFM according to the priority of the second VNFM, a priority corresponding to the second VNFM in the priority relationship;

determining, by the first VNFM, whether the priority corresponding to the second VNFM in the priority relationship is higher than a priority corresponding to a fourth VNFM in the priority relationship; where when the first list includes at least the whitelist, the fourth VNFM is a VNFM that is corresponding to a lowest priority in the priority relationship and that is in VNFMs whose identities are not in the whitelist and that have established a communication interface with the first VNFM; or when the first list does not include the whitelist, the fourth VNFM is a VNFM that is corresponding to a lowest priority in the priority relationship and that is in VNFMs that have established a communication interface with the first VNFM; and when the first VNFM determines that the priority corresponding to the second VNFM in the priority relationship is higher than the priority corresponding to the fourth VNFM in the priority relationship, determining, by the first VNFM, to allow establishment of the communication interface; or when the first VNFM determines that the priority of the second VNFM in the priority relationship is lower than the priority corresponding to the fourth VNFM in the priority relationship, determining, by the first VNFM, not to allow establishment of the communication interface.

With reference to the second possible implementation of the first aspect or the fourth possible implementation of the first aspect, in a fifth possible implementation, the obtaining, by the first VNFM, a priority of the second VNFM includes:

obtaining, by the first VNFM, the priority of the second VNFM that is carried in the interface establishment request message; or obtaining, by the first VNFM, the priority of the second VNFM that is stored in the first VNFM.

With reference to the third possible implementation of the first aspect or the fourth possible implementation of the first aspect, in a sixth possible implementation, after the sending, by the first VNFM, an interface establishment response message to the second VNFM, the method further includes:

obtaining, by the first VNFM, an updated blacklist; and when the first VNFM determines that the updated blacklist includes the identity of the second VNFM, disconnecting, by the first VNFM, the communication interface.

With reference to any one of the first aspect or the first possible implementation of the first aspect to the fifth possible implementation of the first aspect, in a seventh possible implementation, after the sending, by the first VNFM, an interface establishment response message to the second VNFM, the method further includes:

receiving, by the first VNFM, an interface disconnection request message sent by the second VNFM, where the interface disconnection request message is used to instruct the first VNFM to disconnect the communication interface; and disconnecting, by the first VNFM, the communication interface according to the interface disconnection request message.

With reference to any one of the first aspect or the first possible implementation of the first aspect to the fifth possible implementation of the first aspect, in an eighth possible implementation, after the determining, by the first VNFM according to the interface establishment request message and an interface establishment policy of the first VNFM, whether to allow establishment of the communication interface, the method further includes:

when the first VNFM determines not to allow establishment of the communication interface, sending, by the first VNFM, an interface establishment rejection message to the second VNFM, where the interface establishment rejection message is used to indicate that establishment of the communication interface fails.

According to a second aspect, the present invention provides a method for establishing an interface between VNFMs, including:

sending, by a second VNFM, an interface establishment request message to a first VNFM, where the interface establishment request message is used to request to establish a communication interface between the first VNFM and the second VNFM; and receiving, by the second VNFM, an interface establishment response message sent by the first VNFM, where the interface establishment response message is used to indicate that the communication interface is successfully established.

In a first possible implementation of the second aspect, before the sending, by a second VNFM, an interface establishment request message to a first VNFM, the method further includes:

obtaining, by the second VNFM, an attribute of the first VNFM, where the attribute of the first VNFM includes at least an identity of the first VNFM, and the attribute of the first VNFM is used by the second VNFM to send the interface establishment request message to the first VNFM.

With reference to the first possible implementation of the second aspect, in a second possible implementation, the obtaining, by the second VNFM, an attribute of the first VNFM includes:

obtaining, by the second VNFM, the attribute of the first VNFM that is stored in the second VNFM.

With reference to the first possible implementation of the second aspect, in a third possible implementation, the obtaining, by the second VNFM, an attribute of the first VNFM includes:

broadcasting, by the second VNFM, an identity request message, where the identity request message is used to request an attribute of a VNFM to which the interface establishment request message is to be sent; and receiving, by the second VNFM, an identity response message sent by the first VNFM, where the identity response message carries the attribute of the first VNFM.

According to a third aspect, the present invention provides an apparatus, including:

a receiving unit, configured to receive an interface establishment request message sent by a second VNFM, where the interface establishment request message is used to request to establish a communication interface between a first VNFM and the second VNFM;

a determining unit, configured to determine, according to the interface establishment request message received by the receiving unit and an interface establishment policy of the first VNFM, whether to allow establishment of the communication interface; and a sending unit, configured to: when the determining unit determines to allow establishment of the communication interface, send an interface establishment response message to the second VNFM, where the interface establishment response message is used to indicate that the communication interface is successfully established.

In a first possible implementation of the third aspect, the interface establishment policy of the first VNFM includes a maximum quantity of communication interfaces that are allowed by the first VNFM to be established;

the determining unit is specifically configured to determine, according to the interface establishment request message received by the receiving unit, whether a quantity of established communication interfaces of the first VNFM is less than the maximum quantity of communication interfaces that are allowed by the first VNFM to be established; and the determining unit is specifically configured to: determine to allow establishment of the communication interface, when the quantity of established communication interfaces of the first VNFM is less than the maximum quantity of communication interfaces that are allowed by the first VNFM to be established; or the determining unit is specifically configured to: determine not to allow establishment of the communication interface, when the quantity of established communication interfaces of the first VNFM is equal to the maximum quantity of communication interfaces that are allowed by the first VNFM to be established.

With reference to the first possible implementation of the third aspect, in a second possible implementation, the interface establishment policy of the first VNFM further includes a priority relationship between VNFMs, and the priority relationship is used by the first VNFM to establish a communication interface between the first VNFM and another VNFM;

the determining unit is specifically configured to: when the quantity of established communication interfaces of the first VNFM is equal to the maximum quantity of communication interfaces that are allowed by the first VNFM to be established, obtain a priority of the second VNFM;

the determining unit is specifically configured to determine, according to the priority of the second VNFM, a priority corresponding to the second VNFM in the priority relationship;

the determining unit is specifically configured to determine whether the priority corresponding to the second VNFM in the priority relationship is higher than a priority corresponding to a third VNFM in the priority relationship, where the third VNFM is a VNFM that is corresponding to a lowest priority in the priority relationship and that is in VNFMs that have established a communication interface with the first VNFM; and the determining unit is specifically configured to: when the priority corresponding to the second VNFM in the priority relationship is higher than the priority corresponding to the third VNFM in the priority relationship, determine to allow establishment of the communication interface; or the determining unit is specifically configured to: when the priority corresponding to the second VNFM in the priority relationship is lower than the priority corresponding to the third VNFM in the priority relationship, determine not to allow establishment of the communication interface.

With reference to the third aspect, in a third possible implementation, the interface establishment policy of the first VNFM includes a maximum quantity of communication interfaces that are allowed by the first VNFM to be established and a first list, the first list includes at least one of a blacklist or a whitelist, the blacklist includes an identity of a VNFM that is not allowed by the first VNFM to establish an interface with the first VNFM, and the whitelist includes an identity of a VNFM that is allowed by the first VNFM to establish an interface with the first VNFM, and the interface establishment request message carries an identity of the second VNFM;

the determining unit is specifically configured to obtain the identity of the second VNFM that is carried in the interface establishment request message; and the determining unit is specifically configured to: when the first list includes at least the whitelist and the whitelist includes the identity of the second VNFM, determine to allow establishment of the communication interface; or the determining unit is specifically configured to: when the first list includes at least the blacklist and the blacklist includes the identity of the second VNFM, determine not to allow establishment of the communication interface; or the determining unit is specifically configured to: when the first list does not include the identity of the second VNFM, determine whether a quantity of established communication interfaces of the first VNFM is less than the maximum quantity of communication interfaces that are allowed by the first VNFM to be established; and the determining unit is specifically configured to: determine to allow establishment of the communication interface, when the quantity of established communication interfaces of the first VNFM is less than the maximum quantity of communication interfaces that are allowed by the first VNFM to be established; or the determining unit is specifically configured to: determine not to allow establishment of the communication interface, when the quantity of established communication interfaces of the first VNFM is equal to the maximum quantity of communication interfaces that are allowed by the first VNFM to be established.

With reference to the third possible implementation of the third aspect, in a fourth possible implementation, the interface establishment policy of the first VNFM further includes a priority relationship between VNFMs, and the priority relationship is used by the first VNFM to establish a communication interface between the first VNFM and another VNFM;

the determining unit is specifically configured to: when the quantity of established communication interfaces of the first VNFM is equal to the maximum quantity of communication interfaces that are allowed by the first VNFM to be established, obtain a priority of the second VNFM;

the determining unit is specifically configured to determine, according to the priority of the second VNFM, a priority corresponding to the second VNFM in the priority relationship;

the determining unit is specifically configured to determine whether the priority corresponding to the second VNFM in the priority relationship is higher than a priority corresponding to a fourth VNFM in the priority relationship; where when the first list includes at least the whitelist, the fourth VNFM is a VNFM that is corresponding to a lowest priority in the priority relationship and that is in VNFMs whose identities are not in the whitelist and that have established a communication interface with the first VNFM; or when the first list does not include the whitelist, the fourth VNFM is a VNFM that is corresponding to a lowest priority in the priority relationship and that is in VNFMs that have established a communication interface with the first VNFM; and the determining unit is specifically configured to: when the priority corresponding to the second VNFM in the priority relationship is higher than the priority corresponding to the fourth VNFM in the priority relationship, determine to allow establishment of the communication interface; or the determining unit is specifically configured to: when the priority of the second VNFM in the priority relationship is lower than the priority corresponding to the fourth VNFM in the priority relationship, determine not to allow establishment of the communication interface.

With reference to the second possible implementation of the third aspect or the fourth possible implementation of the third aspect, in a fifth possible implementation, the determining unit is specifically configured to obtain the priority of the second VNFM that is carried in the interface establishment request message; or the determining unit is specifically configured to obtain the priority of the second VNFM that is stored in the first VNFM.

With reference to the third possible implementation of the third aspect or the fourth possible implementation of the third aspect, in a sixth possible implementation, the apparatus further includes an obtaining unit and a disconnection unit; where the obtaining unit is configured to obtain an updated blacklist after the sending unit sends the interface establishment response message to the second VNFM; and the disconnection unit is configured to disconnect the communication interface when the updated blacklist obtained by the obtaining unit includes the identity of the second VNFM.

With reference to any one of the third aspect or the first possible implementation of the third aspect to the fifth possible implementation of the third aspect, in a seventh possible implementation, the apparatus further includes a disconnection unit, where the receiving unit is further configured to: after the sending unit sends the interface establishment response message to the second VNFM, receive an interface disconnection request message sent by the second VNFM, where the interface disconnection request message is used to instruct the disconnection unit to disconnect the communication interface; and the disconnection unit is configured to disconnect the communication interface according to the interface disconnection request message received by the receiving unit.

With reference to any one of the third aspect or the first possible implementation of the third aspect to the fifth possible implementation of the third aspect, in an eighth possible implementation, the sending unit is further configured to: when the determining unit determines not to allow establishment of the communication interface, send an interface establishment rejection message to the second VNFM, where the interface establishment rejection message is used to indicate that establishment of the communication interface fails.

According to a fourth aspect, the present invention provides an apparatus, including:

a sending unit, configured to send an interface establishment request message to a first VNFM, where the interface establishment request message is used to request to establish a communication interface between the first VNFM and the second VNFM; and a receiving unit, configured to receive an interface establishment response message sent by the first VNFM, where the interface establishment response message is used to indicate that the communication interface is successfully established.

In a first possible implementation of the fourth aspect, the apparatus further includes an obtaining unit; where the obtaining unit is configured to obtain an attribute of the first VNFM before the sending unit sends the interface establishment request message to the first VNFM, where the attribute of the first VNFM includes at least an identity of the first VNFM, and the attribute of the first VNFM is used by the sending unit to send the interface establishment request message to the first VNFM.

With reference to the first possible implementation of the fourth aspect, in a second possible implementation, the obtaining unit is specifically configured to obtain the attribute of the first VNFM that is stored in the second VNFM.

With reference to the first possible implementation of the fourth aspect, in a third possible implementation, the obtaining unit includes a broadcast module and a receiving module; where the broadcast module is configured to broadcast an identity request message, where the identity request message is used to request an attribute of a VNFM to which the interface establishment request message is to be sent; and the receiving module is configured to receive an identity response message sent by the first VNFM, where the identity response message carries the attribute of the first VNFM.

According to a fifth aspect, the present invention provides an apparatus, including:

a processor, configured to receive an interface establishment request message sent by a second VNFM, where the interface establishment request message is used to request to establish a communication interface between a first VNFM and the second VNFM; where the processor is further configured to determine, according to the interface establishment request message and an interface establishment policy of the first VNFM, whether to allow establishment of the communication interface; and the processor is further configured to: when determining to allow establishment of the communication interface, send an interface establishment response message to the second VNFM, where the interface establishment response message is used to indicate that the communication interface is successfully established.

In a first possible implementation of the fifth aspect, the interface establishment policy of the first VNFM includes a maximum quantity of communication interfaces that are allowed by the first VNFM to be established; and the processor is specifically configured to determine, according to the interface establishment request message, whether a quantity of established communication interfaces of the first VNFM is less than the maximum quantity of communication interfaces that are allowed by the first VNFM to be established; and the processor is specifically configured to: when the quantity of established communication interfaces of the first VNFM is less than the maximum quantity of communication interfaces that are allowed by the first VNFM to be established, determine to allow establishment of the communication interface; or the processor is specifically configured to: when the quantity of established communication interfaces of the first VNFM is equal to the maximum quantity of communication interfaces that are allowed by the first VNFM to be established, determine not to allow establishment of the communication interface.

With reference to the first possible implementation of the fifth aspect, in a second possible implementation, the interface establishment policy of the first VNFM further includes a priority relationship between VNFMs, and the priority relationship is used by the first VNFM to establish a communication interface between the first VNFM and another VNFM;

the processor is specifically configured to: when the quantity of established communication interfaces of the first VNFM is equal to the maximum quantity of communication interfaces that are allowed by the first VNFM to be established, obtain a priority of the second VNFM;

the processor is specifically configured to determine, according to the priority of the second VNFM, a priority corresponding to the second VNFM in the priority relationship;

the processor is specifically configured to determine whether the priority corresponding to the second VNFM in the priority relationship is higher than a priority corresponding to a third VNFM in the priority relationship, where the third VNFM is a VNFM that is corresponding to a lowest priority in the priority relationship and that is in VNFMs that have established a communication interface with the first VNFM; and the processor is specifically configured to: when the priority corresponding to the second VNFM in the priority relationship is higher than the priority corresponding to the third VNFM in the priority relationship, determine to allow establishment of the communication interface; or the processor is specifically configured to: when the priority corresponding to the second VNFM in the priority relationship is lower than the priority corresponding to the third VNFM in the priority relationship, determine not to allow establishment of the communication interface.

With reference to the fifth aspect, in a third possible implementation, the interface establishment policy of the first VNFM includes a maximum quantity of communication interfaces that are allowed by the first VNFM to be established and a first list, the first list includes at least one of a blacklist or a whitelist, the blacklist includes an identity of a VNFM that is not allowed by the first VNFM to establish an interface with the first VNFM, and the whitelist includes an identity of a VNFM that is allowed by the first VNFM to establish an interface with the first VNFM, and the interface establishment request message carries an identity of the second VNFM;

the processor is specifically configured to obtain the identity of the second VNFM that is carried in the interface establishment request message; and the processor is specifically configured to: when the first list includes at least the whitelist and the whitelist includes the identity of the second VNFM, determine to allow establishment of the communication interface; or the processor is specifically configured to: when the first list includes at least the blacklist and the blacklist includes the identity of the second VNFM, determine not to allow establishment of the communication interface; or the processor is specifically configured to: when the first list does not include the identity of the second VNFM, determine whether a quantity of established communication interfaces of the first VNFM is less than the maximum quantity of communication interfaces that are allowed by the first VNFM to be established; and the processor is specifically configured to: when the quantity of established communication interfaces of the first VNFM is less than the maximum quantity of communication interfaces that are allowed by the first VNFM to be established, determine to allow establishment of the communication interface; or the processor is specifically configured to: when the quantity of established communication interfaces of the first VNFM is equal to the maximum quantity of communication interfaces that are allowed by the first VNFM to be established, determine not to allow establishment of the communication interface.

With reference to the third possible implementation of the fifth aspect, in a fourth possible implementation, the interface establishment policy of the first VNFM further includes a priority relationship between VNFMs, and the priority relationship is used by the first VNFM to establish a communication interface between the first VNFM and another VNFM;

the processor is specifically configured to: when the quantity of established communication interfaces of the first VNFM is equal to the maximum quantity of communication interfaces that are allowed by the first VNFM to be established, obtain a priority of the second VNFM;

the processor is specifically configured to determine, according to the priority of the second VNFM, a priority corresponding to the second VNFM in the priority relationship;

the processor is specifically configured to determine whether the priority corresponding to the second VNFM in the priority relationship is higher than a priority corresponding to a fourth VNFM in the priority relationship; where when the first list includes at least the whitelist, the fourth VNFM is a VNFM that is corresponding to a lowest priority in the priority relationship and that is in VNFMs whose identities are not in the whitelist and that have established a communication interface with the first VNFM; or when the first list does not include the whitelist, the fourth VNFM is a VNFM that is corresponding to a lowest priority in the priority relationship and that is in VNFMs that have established a communication interface with the first VNFM; and the processor is specifically configured to: when the priority corresponding to the second VNFM in the priority relationship is higher than the priority corresponding to the fourth VNFM in the priority relationship, determine to allow establishment of the communication interface; or the processor is specifically configured to: when the priority of the second VNFM in the priority relationship is lower than the priority corresponding to the fourth VNFM in the priority relationship, determine not to allow establishment of the communication interface.

With reference to the second possible implementation of the fifth aspect or the fourth possible implementation of the fifth aspect, in a fifth possible implementation, the processor is specifically configured to obtain the priority of the second VNFM that is carried in the interface establishment request message; or the processor is specifically configured to obtain the priority of the second VNFM that is stored in the first VNFM.

With reference to the third possible implementation of the fifth aspect or the fourth possible implementation of the fifth aspect, in a sixth possible implementation, the processor is further configured to obtain an updated blacklist after sending the interface establishment response message to the second VNFM; and the processor is further configured to disconnect the communication interface when determining that the updated blacklist includes the identity of the second VNFM.

With reference to any one of the fifth aspect or the first possible implementation of the fifth aspect to the fifth possible implementation of the fifth aspect, in a seventh possible implementation, the processor is further configured to: after sending the interface establishment response message to the second VNFM, receive an interface disconnection request message sent by the second VNFM, where the interface disconnection request message is used to instruct the processor to disconnect the communication interface; and the processor is further configured to disconnect the communication interface according to the interface disconnection request message.

With reference to any one of the fifth aspect or the first possible implementation of the fifth aspect to the fifth possible implementation of the fifth aspect, in an eighth possible implementation, the processor is further configured to: when determining not to allow establishment of the communication interface, send an interface establishment rejection message to the second VNFM, where the interface establishment rejection message is used to indicate that establishment of the communication interface fails.

According to a sixth aspect, the present invention provides an apparatus, including:

a processor, configured to send an interface establishment request message to a first VNFM, where the interface establishment request message is used to request to establish a communication interface between the first VNFM and the second VNFM; where the processor is further configured to receive an interface establishment response message sent by the first VNFM, where the interface establishment response message is used to indicate that the communication interface is successfully established.

In a first possible implementation of the sixth aspect, the processor is configured to obtain an attribute of the first VNFM before sending the interface establishment request message to the first VNFM, where the attribute of the first VNFM includes at least an identity of the first VNFM, and the attribute of the first VNFM is used to send the interface establishment request message to the first VNFM.

With reference to the first possible implementation of the sixth aspect, in a second possible implementation, the processor is specifically configured to obtain the attribute of the first VNFM that is stored in the second VNFM.

With reference to the first possible implementation of the sixth aspect, in a third possible implementation, the processor is specifically configured to broadcast an identity request message, where the identity request message is used to request an attribute of a VNFM to which the interface establishment request message is to be sent; and the processor is specifically configured to receive an identity response message sent by the first VNFM, where the identity response message carries the attribute of the first VNFM.

According to a seventh aspect, the present invention provides a communications system, including:

the apparatus according to any one of the third aspect or the implementations of the third aspect and the apparatus according to any one of the fourth aspect or the implementations of the fourth aspect; or the apparatus according to any one of the fifth aspect or the implementations of the fifth aspect and the apparatus according to any one of the sixth aspect or the implementations of the sixth aspect.

The present invention provides a method and an apparatus for establishing an interface between VNFMs, and a system. The method may include: receiving, by a first VNFM, an interface establishment request message sent by a second VNFM, determining, according to the interface establishment request message and an interface establishment policy of the first VNFM, whether to allow establishment of the communication interface, and when the first VNFM determines to allow establishment of the communication interface, sending, by the first VNFM, an interface establishment response message to the second VNFM, where the interface establishment request message is used to request to establish the communication interface between the first VNFM and the second VNFM, and the interface establishment response message is used to indicate that the communication interface is successfully established. According to the method and the apparatus for establishing an interface between VNFMs, and the system provided in the present invention, after the second VNFM sends the interface establishment request message to the first VNFM, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

BRIEF DESCRIPTION OF DRAWINGS

To describe the technical solutions in the embodiments of the present invention, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
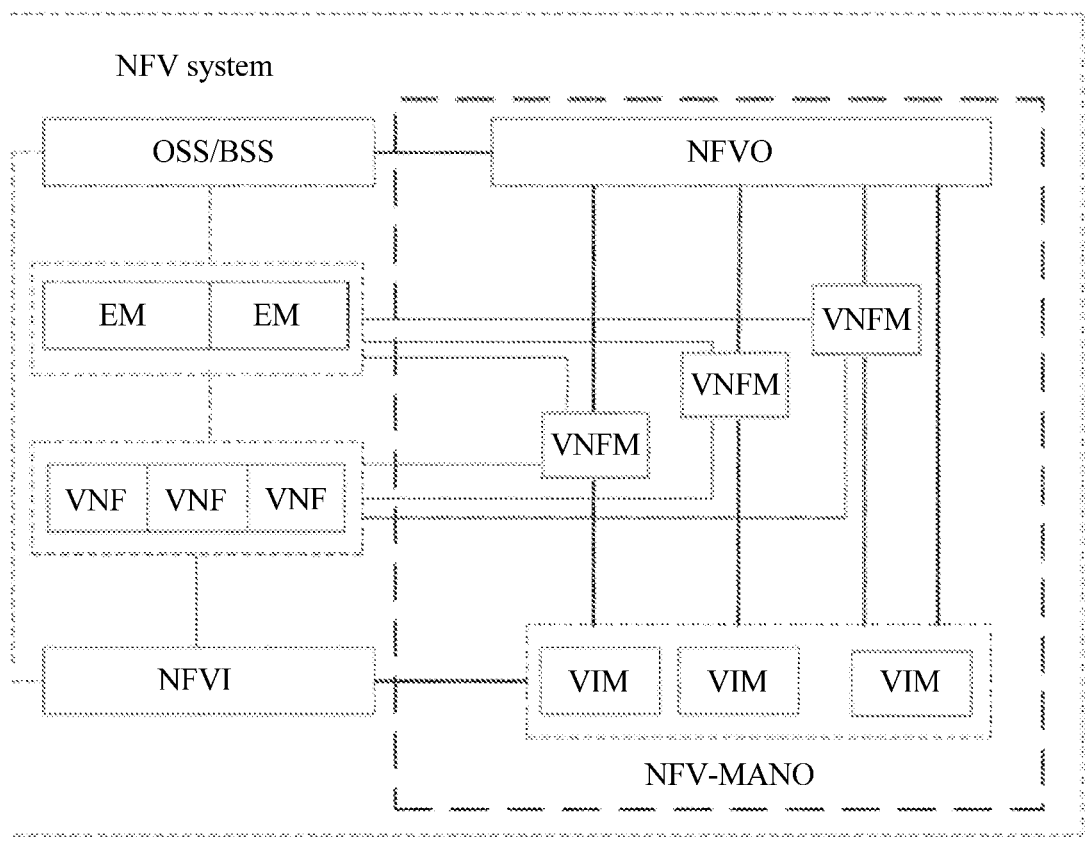
FIG. 1 is a block diagram of an NFV system.

As shown in FIG. 1, FIG. 1 is a block diagram of an NFV system. The NFV system includes an NFVO, a VNFM, a virtualized infrastructure manager (English: virtualized infrastructure manager, VIM for short), an operations support system (English: operations support system, OSS for short) or a business support system (English: business support system, BSS for short), an element manager (English: element manager, EM for short), a VNF node, and a network function virtualization infrastructure (English: network function virtualization infrastructure, NFVI for short).

In the NFV system, the NFVO, the VNFM, and the VIM form a management and orchestration domain of the NFV system (English: NFV management and orchestration, NFV-MANO for short). The NFVO may also be referred to as a network function virtualization orchestrator. The OSS/BSS may be referred to as a network manager (English: network manager, NM for short).

Specifically, there is at least one VNFM in an NFV system, and all VNFMs are connected to an NFVO. All the VNFMs may be connected to a same EM, or may be respectively connected to different EMs. In the prior art, in an NFV system, because all VNFMs are connected to a same NFVO, and information interaction among all the VNFMs is completed with assistance of the NFVO, efficiency of communication among all the VNFMs is relatively low.

Efficiency of communication between VNFMs can be improved to some extent by using a method and an apparatus for establishing an interface between VNFMs, and a system provided in the embodiments of the present invention.

It should be noted that any function node in the NFV system may be distributed on one entity device, or may be distributed on multiple entity devices, and multiple function nodes in the NFV system may be respectively distributed on different entity devices, or may be distributed on one entity device. It may be understood that any function node in the NFV system may be a logical function module in an entity device, or may be a logical function module formed by multiple entity devices.

Therefore, in the embodiments of the present invention, one entity device may perform all steps in the method provided in the embodiments of the present invention, or multiple entity devices may collaboratively perform all steps in the method provided in the embodiments of the present invention. This is not limited in the present invention.

Further, to more clearly describe the method for establishing an interface between VNFMs that is provided in the present invention, the following gives description by using a logical function module (that is, a function node in an NFV system) as an execution body or a control object. A person skilled in the art should understand that during a specific implementation, the logical function module depends on a hardware resource of an entity device on which the logical function module is located.

In the embodiments of the present invention, the NFV system may be applied to a Long Term Evolution (English: long term evolution, LTE for short) communications system, and may also be applied to an evolved communications system of LTE, for example, an LTE-A (English full name: long term evolution advanced) system, and may be further applied to a third generation mobile communications (English: $3^{rd}$-Generation, 3G for short) system such as WCDMA, and the like. This is not limited in the present invention.

Embodiment 1

Figure 2:
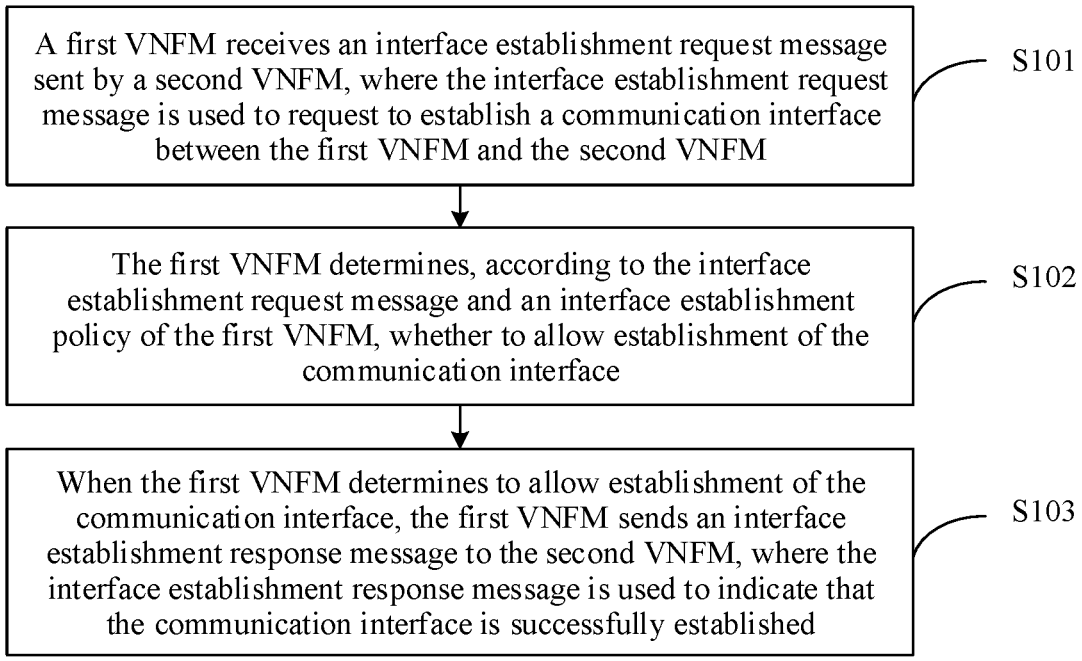
FIG. 2 is a flowchart of a method for establishing an interface between VNFMs according to an embodiment of the present invention.

This embodiment of the present invention provides a method for establishing an interface between VNFMs. As shown in FIG. 2, the method may include the following steps.

S101. A first VNFM receives an interface establishment request message sent by a second VNFM, where the interface establishment request message is used to request to establish a communication interface between the first VNFM and the second VNFM.

S102. The first VNFM determines, according to the interface establishment request message and an interface establishment policy of the first VNFM, whether to allow establishment of the communication interface.

Specifically, when the first VNFM receives the interface establishment request message sent by the second VNFM, the first VNFM may learn that the second VNFM requests to establish the communication interface with the first VNFM, and the first VNFM needs to determine, according to the interface establishment request message and the interface establishment policy of the first VNFM, whether to allow establishment of the communication interface.

The interface establishment request message may include an attribute of the second VNFM. The attribute of the second VNFM includes at least an identity of the second VNFM, or includes an identity of the second VNFM and a priority of the second VNFM. The attribute of the second VNFM may further include vendor information of the second VNFM, version information of the second VNFM, and the like.

For example, in this embodiment of the present invention, the interface establishment policy of the first VNFM includes at least a maximum quantity of communication interfaces that are allowed by the first VNFM to be established.

The maximum quantity of communication interfaces that are allowed by the first VNFM to be established may be a maximum quantity of communication interfaces that can be allowed to be established by using a resource occupied by the first VNFM, or may be set according to an actual engineering requirement.

Optionally, the interface establishment policy of the first VNFM may further include a priority relationship between VNFMs. The priority relationship is used by the first VNFM to establish a communication interface between the first VNFM and another VNFM.

Specifically, the first VNFM may first determine, according to a priority of another VNFM, a priority corresponding to the another VNFM in the priority relationship, and then determine, according to the priority corresponding to the another VNFM in the priority relationship, whether to allow establishment of a communication interface between the first VNFM and the another VNFM.

A priority of a VNFM indicates, in an NFV system, an attribute configured for the VNFM according to a service requirement of each network element in the NFV system, that is, the priority of the VNFM is an attribute possessed by the VNFM itself.

A priority corresponding to a VNFM in the priority relationship indicates a priority redefined for a VNFM with a different priority attribute according to a service requirement of the first VNFM when the first VNFM establishes a communication interface with another VNFM.

For example, it is assumed that in the NFV system, there are a VNFM whose priority is 1, a VNFM whose priority is 2, a VNFM whose priority is 3, a VNFM whose priority is 4, and a VNFM whose priority is 5, and priorities of VNFMs in descending order may be sequentially 1, 2, 3, 4, and 5.

A priority relationship between VNFMs that is required when the first VNFM establishes a communication interface between the first VNFM and another VNFM may be shown in Table 1. That is, a priority corresponding to the VNFM whose priority is 1 is 3 in the priority relationship, a priority corresponding to the VNFM whose priority is 2 is 2 in the priority relationship, a priority corresponding to the VNFM whose priority is 3 is 5 in the priority relationship, a priority corresponding to the VNFM whose priority is 4 is 1 in the priority relationship, and a priority corresponding to the VNFM whose priority is 5 is 4 in the priority relationship.

Specifically, it is assumed that the VNFM whose priority is 3 and the VNFM whose priority is 4 simultaneously request to establish a communication interface with the first VNFM. Although the priority of the VNFM whose priority is 3 is higher than the priority of the VNFM whose priority is 4, for the first VNFM, the VNFM whose priority is 4 has a highest priority when the first VNFM establishes a communication interface with another VNFM. Therefore, when the first VNFM allows establishment of only one communication interface, the first VNFM determines, according to priorities in the priority relationship that are corresponding to the VNFM whose priority is 3 and the VNFM whose priority is 4, that the priority 1 in the priority relationship that is corresponding to the VNFM whose priority is 4 is higher than the priority 5 in the priority relationship that is corresponding to the VNFM whose priority is 3. Therefore, the first VNFM allows establishment of a communication interface between the first VNFM and the VNFM whose priority is 4.

TABLE 1

| VNFM | Priority corresponding to a VNFM in the priority relationship |
| --- | --- |
| VNFM whose priority is 1 | 3 |
| VNFM whose priority is 2 | 2 |
| VNFM whose priority is 3 | 5 |
| VNFM whose priority is 4 | 1 |
| VNFM whose priority is 5 | 4 |

Optionally, in this embodiment of the present invention, the interface establishment policy of the first VNFM may further include a first list. The first list includes at least one of a blacklist or a whitelist. The blacklist includes an identity of a VNFM that is not allowed by the first VFNM to establish an interface with the first VNFM. The whitelist includes an identity of a VNFM that is allowed by the first VNFM to establish an interface with the first VNFM.

Specifically, in this embodiment of the present invention, if an identity of a VNFM that is carried in the interface establishment request message received by the first VFNM is an identity in the blacklist, the first VNFM always does not allow establishment of a communication interface between the first VNFM and the VNFM. That is, the first VNFM may determine not to allow establishment of the communication interface between the first VNFM and the VNFM provided that the identity of the VNFM is an identity in the blacklist.

If an identity of a VNFM that is carried in the interface establishment request message received by the first VFNM is an identity in the whitelist, the first VNFM always allows establishment of a communication interface between the first VNFM and the VNFM. That is, the first VNFM may determine to allow establishment of the communication interface between the first VNFM and the VNFM provided that the identity of the VNFM is an identity in the whitelist.

S103. When the first VNFM determines to allow establishment of the communication interface, the first VNFM sends an interface establishment response message to the second VNFM, where the interface establishment response message is used to indicate that the communication interface is successfully established.

It should be noted that in this embodiment of the present invention, if the first VNFM sends the interface establishment response message to the second VNFM, it indicates that the communication interface between the first VNFM and the second VNFM is successfully established.

It may be understood that when the first VNFM allows establishment of the communication interface between the first VNFM and the second VNFM, the first VNFM allocates a resource to the communication interface according to a resource of the first VNFM, and sends the interface establishment response message to the second VNFM, so as to complete establishment of the communication interface between the first VNFM and the second VNFM. Therefore, the first VNFM and the second VNFM may directly perform information interaction by using the communication interface.

A communication interface between VNFMs can be established by executing the method in S101 to S103, so that the VNFMs can directly perform information interaction, thereby improving efficiency of communication between the VNFMs. In addition, in a network construction process, when only one relatively small-scale NFV system needs to be established, for example, at a preliminary stage of network construction, because a communication interface between VNFMs is established by using the method for establishing an interface between VNFMs provided in this embodiment of the present invention, information interaction between the VNFMs no longer requires forwarding by an NFVO. Therefore, there is no need to dispose a dedicated NFVO, thereby greatly reducing network construction costs.

Further, to better describe the method for establishing an interface between VNFMs provided in this embodiment of the present invention, with reference to several examples, the following describes S102 in which the first VNFM determines, according to the interface establishment request message and an interface establishment policy of the first VNFM, whether to allow establishment of the communication interface.

In a first example, it is assumed that the interface establishment policy of the first VNFM includes a maximum quantity of communication interfaces that are allowed by the first VNFM to be established.

After the first VNFM receives the interface establishment request message, the first VNFM may determine, according to the maximum quantity of communication interfaces that are allowed by the first VNFM to be established, whether to allow establishment of the communication interface. Specifically, S102 may include:

S10. The first VNFM determines, according to the interface establishment request message, whether a quantity of established communication interfaces of the first VNFM is less than the maximum quantity of communication interfaces that are allowed by the first VNFM to be established.

S11. When the quantity of established communication interfaces of the first VNFM is less than the maximum quantity of communication interfaces that are allowed by the first VNFM to be established, the first VNFM determines to allow establishment of the communication interface.

S12. When the quantity of established communication interfaces of the first VNFM is equal to the maximum quantity of communication interfaces that are allowed by the first VNFM to be established, the first VNFM determines not to allow establishment of the communication interface.

In a second example, it is assumed that the interface establishment policy of the first VNFM includes a maximum quantity of communication interfaces that are allowed by the first VNFM to be established and a predefined priority relationship between VNFMs, and the interface establishment request message carries a priority of the second VNFM.

After the first VNFM receives the interface establishment request message, the first VNFM may determine, according to the maximum quantity of communication interfaces that are allowed by the first VNFM to be established, the priority relationship, and the priority of the second VNFM, whether to allow establishment of the communication interface. Specifically, S102 may include:

S20. The first VNFM determines, according to the interface establishment request message, whether a quantity of established communication interfaces of the first VNFM is less than the maximum quantity of communication interfaces that are allowed by the first VNFM to be established.

S21. When the quantity of established communication interfaces of the first VNFM is less than the maximum quantity of communication interfaces that are allowed by the first VNFM to be established, the first VNFM determines to allow establishment of the communication interface.

S22. When the quantity of established communication interfaces of the first VNFM is equal to the maximum quantity of communication interfaces that are allowed by the first VNFM to be established, the first VNFM obtains the priority of the second VNFM.

Specifically, in this embodiment of the present invention, the first VNFM may obtain the priority of the second VNFM in the following two manners (manner 1 and manner 2).

In manner 1, the first VNFM obtains the priority of the second VNFM that is carried in the interface establishment request message.

That is, in manner 1, the interface establishment request message sent by the second VNFM carries the priority of the second VNFM. Therefore, the first VNFM may obtain the priority of the second VNFM from the interface establishment request message.

In manner 2, the first VNFM obtains the priority of the second VNFM that is stored in the first VNFM.

Specifically, attributes of all VNFMs that may perform information interaction with the first VNFM in the NFV system may be pre-stored in the first VNFM. Attributes of multiple VNFMs that are stored in the first VNFM include at least identities of the multiple VNFMs and priorities of the multiple VNFMs.

After receiving the interface establishment request message sent by the second VNFM, the first VNFM determines, according to an identity of the second VNFM that is carried in the interface establishment request message and from the attributes of the multiple VNFMs that are stored in the first VNFM, the priority of the second VNFM that is corresponding to the identity of the second VNFM.

Before the first VNFM receives the interface establishment request message sent by the second VNFM, that is, before the first VNFM establishes a communication interface with another VNFM, the first VNFM may first broadcast an identity request message. The identity request message is used to request an attribute of a VNFM that may perform information interaction with the first VNFM. The attribute of the VNFM includes at least an identity of the VNFM and a priority of the VNFM.

Each VNFM that can receive the identity request message broadcast by the first VNFM is a VNFM that may perform information interaction with the first VNFM. Each VNFM that receives the identity request message sends its attribute to the first VNFM by adding the attribute to an identity response message.

After receiving the identity response message sent by each VNFM, the first VNFM stores the attribute of each VNFM in the first VNFM. Therefore, after receiving the interface establishment request message sent by the second VNFM, the first VNFM determines, according to the identity of the second VNFM that is carried in the interface establishment request message and from the attributes of the multiple VNFMs that are stored in the first VNFM, the priority of the second VNFM that is corresponding to the identity of the second VNFM.

S23. The first VNFM determines, according to the priority of the second VNFM, a priority corresponding to the second VNFM in the priority relationship.

For example, it is assumed that the priority of the second VNFM is 1, and it can be learned from Table 1 that the priority of the second VNFM in the priority relationship is 3.

S24. The first VNFM determines whether the priority corresponding to the second VNFM in the priority relationship is higher than a priority corresponding to a third VNFM in the priority relationship.

The third VNFM is a VNFM that is corresponding to a lowest priority in the priority relationship and that is in VNFMs that have established a communication interface with the first VNFM.

For example, it is assumed that there are five VNFMs that have established a communication interface with the first VNFM: a VNFM 1, a VNFM 2, a VNFM 3, a VNFM 4, and a VNFM 5. Both priorities corresponding to the VNFM 1 and the VNFM 2 in the priority relationship shown in Table 1 are 1, both priorities corresponding to the VNFM 3 and the VNFM 4 in the priority relationship are 2, and a priority corresponding to the VNFM 5 in the priority relationship is 5. Because the VNFM 5 in the five VNFMs is corresponding to a lowest priority in the priority relationship, the VNFM 5 is the third VNFM.

S25. When the first VNFM determines that the priority of the second VNFM in the priority relationship is higher than the priority of the third VNFM in the priority relationship, the first VNFM determines to allow establishment of the communication interface.

For example, it is assumed that the priority corresponding to the second VNFM in the priority relationship is 3, and the priority corresponding to the third VNFM in the priority relationship is 5. Because the priority corresponding to the second VNFM in the priority relationship is higher than the priority corresponding to the third VNFM in the priority relationship, the first VNFM determines to allow establishment of the communication interface between the first VNFM and the second VNFM.

S26. When the first VNFM determines that the priority corresponding to the second VNFM in the priority relationship is lower than the priority corresponding to the third VNFM in the priority relationship, the first VNFM determines not to allow establishment of the communication interface.

It should be noted that in this embodiment of the present invention, when the quantity of established communication interfaces of the first VNFM is equal to the maximum quantity of communication interfaces that are allowed by the first VNFM to be established, after receiving the interface establishment request message sent by the second VNFM, the first VNFM may compare the priority corresponding to the second VNFM in the predefined priority relationship between VNFMs with the priority corresponding to the third VNFM in the priority relationship.

When the priority corresponding to the second VNFM in the priority relationship is higher than the priority corresponding to the third VNFM in the priority relationship, the first VNFM may first disconnect a communication interface established between the first VNFM and the third VNFM, that is, releases a resource occupied by the communication interface between the first VNFM and the third VNFM in the first VNFM, so as to reserve a resource required for the to-be-established communication interface between the first VNFM and the second VNFM.

Further, when the first VNFM disconnects the communication interface between the first VNFM and the third VNFM, the first VNFM further needs to send an interface disconnection request message to the third VNFM, so as to notify the third VNFM that the first VNFM has disconnected the communication interface between the first VNFM and the third VNFM. When receiving the interface disconnection request message, the third VNFM may disconnect the communication interface between the third VNFM and the first VNFM according to the interface disconnection request message, that is, releases a resource occupied by the communication interface between the first VNFM and the third VNFM in the third VNFM.

In a third example, it is assumed that the interface establishment policy of the first VNFM includes a maximum quantity of communication interfaces that are allowed by the first VNFM to be established and a first list, and the interface establishment request message carries an identity of the second VNFM.

After the first VNFM receives the interface establishment request message, the first VNFM may determine, according to the maximum quantity of communication interfaces that are allowed by the first VNFM to be established, the first list, and the identity of the second VNFM, whether to allow establishment of the communication interface. Specifically, S102 may include:

S30. The first VNFM obtains the identity of the second VNFM that is carried in the interface establishment request message.

S31. When the first list includes at least a whitelist and the whitelist includes the identity of the second VNFM, the first VNFM determines to allow establishment of the communication interface.

It should be noted that when the first list includes at least the whitelist, that is, when the first list includes the whitelist or the first list includes the whitelist and a blacklist, if the first VNFM determines that the whitelist includes the identity of the second VNFM, regardless of whether a quantity of established communication interfaces of the first VNFM is less than the maximum quantity of communication interfaces that are allowed by the first VNFM to be established, the first VNFMVNFM allows establishment of the communication interface.

Specifically, when the first VNFM determines that the whitelist includes the identity of the second VNFM, and the quantity of established communication interfaces of the first VNFM is equal to the maximum quantity of communication interfaces that are allowed by the first VNFM to be established, the first VNFM may randomly select a VNFM from VNFMs that have established a communication interface with the first VNFM and whose identities are not in the whitelist.

It is assumed that a fifth VNFM is finally selected. The first VNFM may first disconnect a communication interface between the first VNFM and the fifth VNFM, and send an interface disconnection request message to the fifth VNFM, so as to reserve a resource required for the to-be-established communication interface between the first VNFM and the second VNFM.

S32. When the first list includes at least a blacklist and the blacklist includes the identity of the second VNFM, the first VNFM determines not to allow establishment of the communication interface.

Specifically, when the first list includes at least the blacklist, that is, when the first list includes the blacklist or the first list includes the whitelist and the blacklist, the first VNFM may determine not to allow establishment of the communication interface provided that the first VNFMVNFM determines that the blacklist includes the identity of the second VNFM.

S33. When the first list does not include the identity of the second VNFM, the first VNFM determines whether a quantity of established communication interfaces of the first VNFM is less than the maximum quantity of communication interfaces that are allowed by the first VNFM to be established.

It may be understood that when the first list includes the whitelist, that the first list does not include the identity of the second VNFM means that the whitelist does not include the identity of the second VNFM. When the first list includes the blacklist, that the first list does not include the identity of the second VNFM means that the blacklist does not include the identity of the second VNFM. When the first list includes the blacklist and the whitelist, that the first list does not include the identity of the second VNFM means that both the blacklist and the whitelist do not include the identity of the second VNFM.

S34. When the quantity of established communication interfaces of the first VNFM is less than the maximum quantity of communication interfaces that are allowed by the first VNFM to be established, the first VNFM determines to allow establishment of the communication interface.

S35. When the quantity of established communication interfaces of the first VNFM is equal to the maximum quantity of communication interfaces that are allowed by the first VNFM to be established, the first VNFM determines not to allow establishment of the communication interface.

In a fourth example, it is assumed that the interface establishment policy of the first VNFM includes a maximum quantity of communication interfaces that are allowed by the first VNFM to be established, a predefined priority relationship between VNFMs, and a first list, and the interface establishment request message carries at least an identity of the second VNFM.

After the first VNFM receives the interface establishment request message, the first VNFM may determine, according to the maximum quantity of communication interfaces that are allowed by the first VNFM to be established, the priority relationship, the first list, the identity of the second VNFM, and a priority of the second VNFM, whether to allow establishment of the communication interface. Specifically, S102 may include:

S40. The first VNFM obtains the identity of the second VNFM that is carried in the interface establishment request message.

S41. When the first list includes at least a whitelist and the whitelist includes the identity of the second VNFM, the first VNFM determines to allow establishment of the communication interface.

It should be noted that when the first list includes at least the whitelist, if the first VNFM determines that the whitelist includes the identity of the second VNFM, regardless of whether a quantity of established communication interfaces of the first VNFM is less than the maximum quantity of communication interfaces that are allowed by the first VNFM to be established, the first VNFMVNFM allows establishment of the communication interface.

Specifically, when the first VNFM determines that the whitelist includes the identity of the second VNFM, and the quantity of established communication interfaces of the first VNFM is equal to the maximum quantity of communication interfaces that are allowed by the first VNFM to be established, the first VNFM may select a VNFM that is corresponding to a lowest priority in the priority relationship and that is in VNFMs that have established a communication interface with the first VNFM and whose identities are not in the whitelist.

It should be noted that in this embodiment of the present invention, when there are multiple VNFMs corresponding to the lowest priority in the priority relationship, the first VNFM may randomly select one VNFM from the multiple VNFMs.

It is assumed that a fourth VNFM is finally selected. The first VNFM may first disconnect a communication interface between the first VNFM and the fourth VNFM, and send an interface disconnection request message to the fourth VNFM, so as to reserve a resource required for the to-be-established communication interface between the first VNFM and the second VNFM.

S42. When the first list includes at least a blacklist and the blacklist includes the identity of the second VNFM, the first VNFM determines not to allow establishment of the communication interface.

S43. When the first list does not include the identity of the second VNFM, the first VNFM determines whether a quantity of established communication interfaces of the first VNFM is less than the maximum quantity of communication interfaces that are allowed by the first VNFM to be established.

S44. When the quantity of established communication interfaces of the first VNFM is less than the maximum quantity of communication interfaces that are allowed by the first VNFM to be established, the first VNFM determines to allow establishment of the communication interface.

S45. When the quantity of established communication interfaces of the first VNFM is equal to the maximum quantity of communication interfaces that are allowed by the first VNFM to be established, the first VNFM obtains the priority of the second VNFM.

Specifically, for a specific manner of obtaining the priority of the second VNFM by the first VNFM in S46, refer to related description in S22, and details are not described herein.

S46. The first VNFM determines, according to the priority of the second VNFM, a priority corresponding to the second VNFM in the priority relationship.

S47. The first VNFM determines whether the priority corresponding to the second VNFM in the priority relationship is higher than a priority corresponding to a fourth VNFM in the priority relationship.

When the first list includes at least the whitelist, the fourth VNFM is a VNFM that is corresponding to a lowest priority in the priority relationship and that is in VNFMs whose identities are not in the whitelist and that have established a communication interface with the first VNFM.

For example, it is assumed that there are two VNFMs whose identities are not in the whitelist and that have established a communication interface with the first VNFM: a VNFM 4 and a VNFM 5. A priority corresponding to the VNFM 4 in the priority relationship shown in Table 1 is 2, and a priority corresponding to the VNFM 5 in the priority relationship is 5. Because the priority corresponding to the VNFM 5 in the priority relationship is lower than the priority corresponding to the VNFM 4 in the priority relationship, the VNFM 5 is selected as the fourth VNFM.

When the first list does not include the whitelist, that is, when the first list includes the blacklist, the fourth VNFM is a VNFM that is corresponding to a lowest priority in the priority relationship and that is in VNFMs that have established a communication interface with the first VNFM.

S48. When the first VNFM determines that the priority corresponding to the second VNFM in the priority relationship is higher than the priority corresponding to the fourth VNFM in the priority relationship, the first VNFM determines to allow establishment of the communication interface.

S49. When the first VNFM determines that the priority corresponding to the second VNFM in the priority relationship is lower than the priority corresponding to the fourth VNFM in the priority relationship, the first VNFM determines not to allow establishment of the communication interface.

Further, it should be noted that in this embodiment of the present invention, the identity in the first list may dynamically change. That is, both the identity in the blacklist and the identity in the whitelist may dynamically change.

For example, when an operation such as fault detection or parameter debugging needs to be performed on a VNFM in the NFV system, a first list in each VNFM may be dynamically updated, so as to prevent an unnecessary VNFM identity from occurring in the blacklist or the whitelist, which affects network running or debugging.

Specifically, the first list stored in the first VNFM may be dynamically updated. For example, the first list may be directly updated on an operation platform (that is, an operation interface) of the first VNFM, or may be set on an operation platform of an upper-level function node, such as an EM, an NM, or an NFVO, of the first VNFM, and further, the EM, the NM, or the NFVO dynamically updates the first list. Alternatively, an automatic detection system may be preset in the EM, the NM, the NFVO, or the first VNFM. When the automatic detection system is triggered to run, the EM, the NM, the NFVO, or the first VNFM automatically updates the first list.

Further, if the first list includes at least the blacklist, after the first VNFM sends the interface establishment response message to the second VNFM, that is, after the communication interface between the first VNFM and the second VNFM is successfully established, if the blacklist is updated, the first VNFM needs to obtain an updated blacklist.

There are multiple manners of obtaining the updated blacklist by the first VNFM. For example, if the first VNFM can actively update the blacklist, after the first VNFM updates the blacklist, the first VNFM may directly obtain the updated blacklist.

If an upper-level function node of the first VNFM updates the blacklist, after the upper-level node of the first VNFM updates the blacklist, the upper-level node of the first VNFM may send indication information to the first VNFM, and the first VNFM obtains the updated blacklist according to the indication information; or the upper-level function node of the first VNFM may directly send the updated blacklist to the first VNFM, so that the first VNFM queries the updated blacklist.

The first VNFM may perform real-time query on the blacklist, so as to determine whether the blacklist is updated. If the first VNFM determines that the blacklist is updated, the first VNFM obtains the updated blacklist.

Further, in addition to the examples, the first VNFM may obtain the updated blacklist in other manners after the blacklist is updated. The other manners are not listed herein one by one.

If the first VNFM determines that the blacklist includes the identity of the second VNFM, the first VNFM disconnects the communication interface.

After the communication interface between the first VNFM and the second VNFM is successfully established, if the identity of the second VNFM is added to the blacklist after the blacklist stored in the first VNFM is updated, because the identity in the blacklist is an identity of a VNFM that is not allowed by the first VNFM to establish an interface with the first VNFM, the first VNFM disconnects the communication interface after the first VNFM determines, by querying the blacklist, that a latest updated blacklist includes the identity of the second VNFM.

It should be noted that if the identity of the second VNFM is added to the blacklist stored in the first VNFM, an identity of the first VNFM is also added to a blacklist stored in the second VNFM. Likewise, if the identity of the second VNFM is added to the whitelist stored in the first VNFM, the identity of the first VNFM is also added to a whitelist stored in the second VNFM.

Further, in this embodiment of the present invention, the interface establishment policy of the first VNFM is not limited to the three listed interface establishment policies, and may further include another interface establishment policy. In addition, when a communication interface between the first VNFM and another VNFM is established, a used combination manner and an execution sequence of multiple interface establishment policies are not limited to the four listed examples, and may be re-designed according to a requirement when the first VNFM establishes the communication interface with the another VNFM. This is not listed herein one by one.

The method for establishing an interface between VNFMs provided in this embodiment of the present invention may include: receiving, by a first VNFM, an interface establishment request message sent by a second VNFM, determining, according to the interface establishment request message and an interface establishment policy of the first VNFM, whether to allow establishment of the communication interface, and when the first VNFM determines to allow establishment of the communication interface, sending, by the first VNFM, an interface establishment response message to the second VNFM, where the interface establishment request message is used to request to establish the communication interface between the first VNFM and the second VNFM, and the interface establishment response message is used to indicate that the communication interface is successfully established. According to the method, after the second VNFM sends the interface establishment request message to the first VNFM, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

Figure 3:
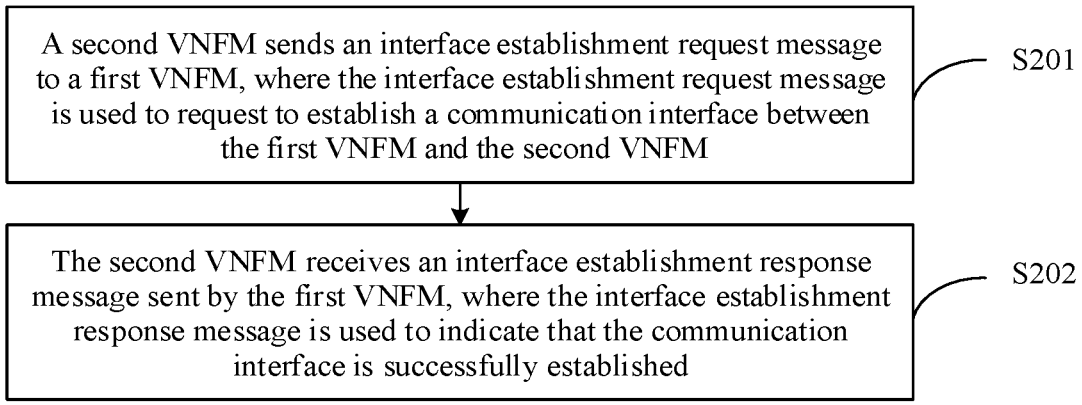
FIG. 3 is a flowchart of a method for establishing an interface between VNFMs according to an embodiment of the present invention.

This embodiment of the present invention provides a method for establishing an interface between VNFMs. As shown in FIG. 3, the method may include the following steps.

S201. A second VNFM sends an interface establishment request message to a first VNFM, where the interface establishment request message is used to request to establish a communication interface between the first VNFM and the second VNFM.

S202. The second VNFM receives an interface establishment response message sent by the first VNFM, where the interface establishment response message is used to indicate that the communication interface is successfully established.

Specifically, in this embodiment of the present invention, when the second VNFM needs to perform information interaction with the first VNFM, the second VNFM sends the interface establishment request message to the first VNFM, so as to request to establish the communication interface between the second VNFM and the first VNFM. Further, after the first VNFM receives the interface establishment request message, the first VNFM sends the interface establishment response message to the second VNFM when the first VNFM determines to allow establishment of the communication interface. Therefore, after the second VNFM receives the interface establishment response message, the second VNFM may perform information interaction with the first VNFM by using the communication interface, so as to meet a service requirement of the second VNFM.

The method for establishing an interface between VNFMs provided in this embodiment of the present invention may include: sending, by a second VNFM, an interface establishment request message to a first VNFM, and receiving an interface establishment response message sent by the first VNFM, where the interface establishment request message is used to request to establish a communication interface between the first VNFM and the second VNFM, and the interface establishment response message is used to indicate that the communication interface is successfully established. According to the method, after the first VNFM receives the interface establishment request message sent by the second VNFM, when the first VNFM determines to allow establishment of the communication interface between the first VNFM and the second VNFM, the first VNFM sends the interface establishment response message to the second VNFM, so as to complete establishment of the communication interface, so that the first VNFM and the second VNFM can directly perform information interaction by using the communication interface, thereby improving efficiency of communication between the first VNFM and the second VNFM.

Embodiment 2

Figure 4:
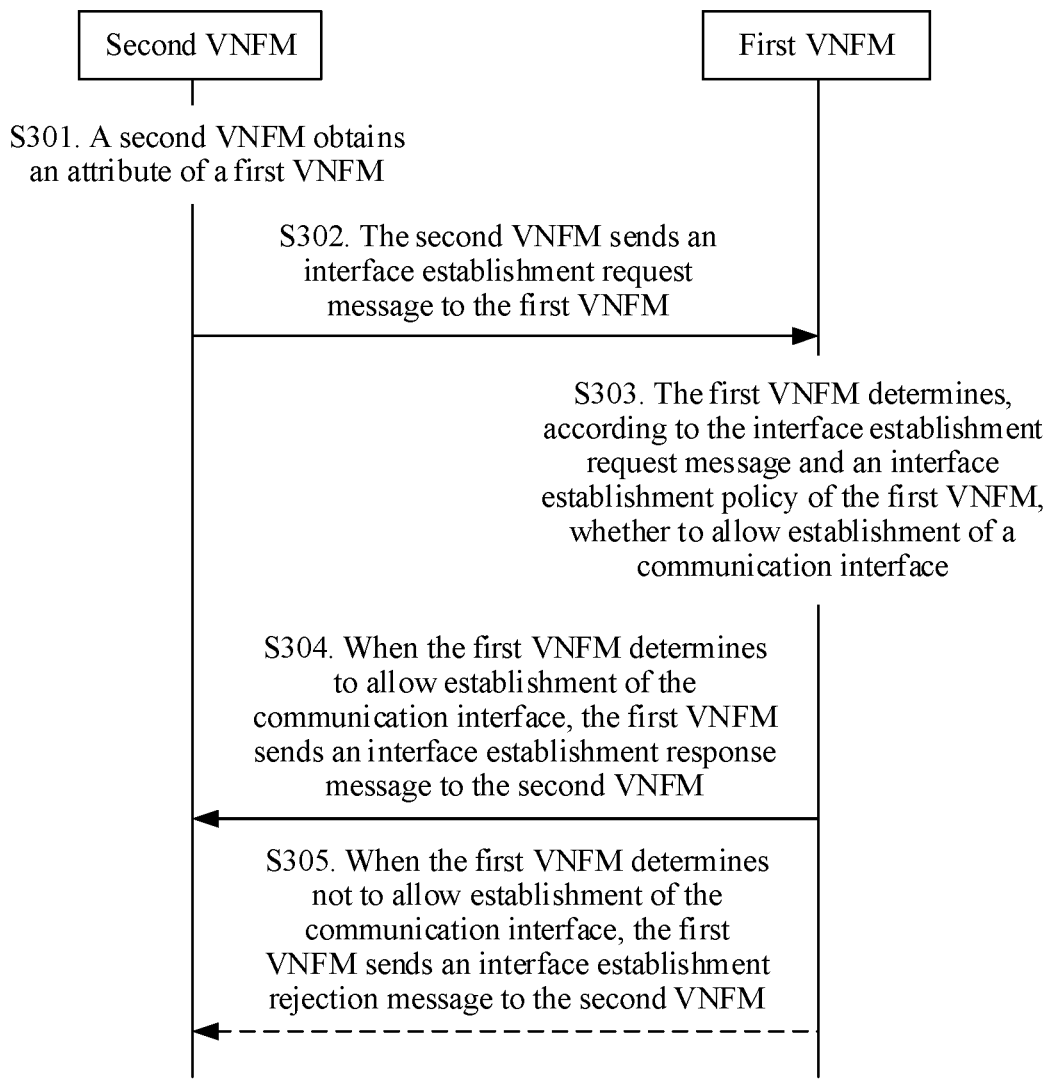
FIG. 4 is an interaction diagram of a method for establishing an interface between VNFMs according to an embodiment of the present invention.

This embodiment of the present invention provides a method for establishing an interface between VNFMs. As shown in FIG. 4, the method may include the following steps.

S301. A second VNFM obtains an attribute of a first VNFM.

In this embodiment of the present invention, before the second VNFM sends an interface establishment request message to the first VNFM, the second VNFM needs to obtain the attribute of the first VNFM, so that the second VNFM can determine, according to the attribute of the first VNFM, to send the interface establishment request message to the first VNFM.

The attribute of the first VNFM includes at least an identity of the first VNFM, or includes an identity of the first VNFM and a priority of the first VNFM. The attribute of the first VNFM may further include vendor information of the first VNFM, version information of the first VNFM, and the like.

It may be understood that when the second VNFM needs to perform information interaction with another VNFM, the second VNFM needs to first determine VNFMs that may perform information interaction with the second VNFM, and then the second VNFM can determine a specific VNFM with which information interaction is to be performed. That is, it may be understood as that before the second VNFM needs to request to establish a communication interface with another VNFM, the second VNFM needs to first obtain attributes of VNFMs that may perform information interaction with the second VNFM, and then can determine a specific VNFM to which the interface establishment request message is to be sent, so as to request to establish a communication interface between the VNFM and the second VNFM.

For example, in this embodiment of the present invention, the attribute of the first VNFM may be obtained in the following two manners (manner 3 and manner 4).

In manner 3, the second VNFM obtains the attribute of the first VNFM that is stored in the second VNFM.

Specifically, attributes of all VNFMs that may perform information interaction with the second VNFM may be pre-stored in the second VNFM, including the attribute of the first VNFM. Then, the second VNFM may learn of an attribute of each VNFM that may perform information interaction with the second VNFM.

In manner 4, the second VNFM broadcasts an identity request message, where the identity request message is used to request an attribute of a VNFM to which the interface establishment request message is to be sent.

Specifically, in this embodiment of the present invention, each VNFM that can receive the identity request message broadcast by the second VNFM is a VNFM that may perform information interaction with the second VNFM.

Therefore, after the first VNFM receives the identity request message, the first VNFM sends an identity response message to the second VNFM. The identity response message carries the attribute of the first VNFM.

After the second VNFM receives the identity response message sent by the first VNFM, the second VNFM may obtain the attribute of the first VNFM from the identity response message.

It may be understood that each of VNFMs that include the first VNFM and that can receive the identity request message sent by the second VNFM sends an attribute of the VNFM to the second VNFM by adding the attribute to an identity response message, so that the second VNFM may learn of an attribute of each VNFM that may perform information interaction with the second VNFM.

S302. The second VNFM sends an interface establishment request message to the first VNFM.

Specifically, when the second VNFM determines that there is a need to perform information interaction with the first VNFM, the second VNFM may send the interface establishment request message to the first VNFM, so as to request to establish a communication interface between the first VNFM and the second VNFM.

Further, in this embodiment of the present invention, when the second VNFM determines that there is a need to perform information interaction with the first VNFM, the second VNFM may further first determine, according to an interface establishment policy of the second VNFM, or an interface establishment policy of the second VNFM and the attribute of the first VNFM, whether to allow establishment of the communication interface between the first VNFM and the second VNFM.

If the second VNFM determines to allow establishment of the communication interface, the second VNFM sends the interface establishment request message to the first VFNM. If the second VNFM determines not to allow establishment of the communication interface, the second VNFM does not send the interface establishment request message to the first VNFM.

The interface establishment policy of the second VNFM is the same as the interface establishment policy of the first VNFM that is shown in the embodiment in FIG. 2, and a manner of determining, by the second VNFM, whether to allow establishment of the communication interface is the same as a manner of determining, by the first VNFM, whether to allow establishment of the communication interface. For details, refer to related description in the embodiment shown in FIG. 2, and details are not described herein.

S303. The first VNFM determines, according to the interface establishment request message and an interface establishment policy of the first VNFM, whether to allow establishment of the communication interface.

Specifically, for a manner of determining, by the first VNFM according to the interface establishment request message and the interface establishment policy of the first VNFM, whether to allow establishment of the communication interface, refer to related description in the embodiment shown in FIG. 2, and details are not described herein.

S304. When the first VNFM determines to allow establishment of the communication interface, the first VNFM sends an interface establishment response message to the second VNFM.

S305. When the first VNFM determines not to allow establishment of the communication interface, the first VNFM sends an interface establishment rejection message to the second VNFM, where the interface establishment rejection message is used to indicate that establishment of the communication interface fails.

It should be noted that in this embodiment of the present invention, either S304 or S305 is performed.

Optionally, in this embodiment of the present invention, after the second VNFM sends the interface establishment request message to the first VNFM, because an information loss may occur in a communication process, the second VNFM may not receive the interface establishment response message or the interface establishment rejection message sent by the first VNFM.

Specifically, when the second VNFM does not receive, in a specific time period, the interface establishment response message or the interface establishment rejection message sent by the first VNFM, if the second VNFM still needs to perform information interaction with the first VNFM, the second VNFM sends the interface establishment request message to the first VNFM again until the second VNFM receives the interface establishment response message or the interface establishment rejection message sent by the first VNFM, or the second VNFM determines that there is no need to perform information interaction with the first VNFM.

Optionally, in this embodiment of the present invention, after the second VNFM receives the interface establishment response message or the interface establishment rejection message, the second VNFM may further send a receiving acknowledgment message to the first VNFM, so as to notify the first VNFM that the second VNFM receives the interface establishment response message or the interface establishment rejection message.

Specifically, after the first VNFM sends the interface establishment response message or the interface establishment rejection message to the second VNFM, if the first VNFM does not receive, in a specific time period, the receiving acknowledgment message sent by the second VNFM, the first VNFM sends the interface establishment response message or the interface establishment rejection message to the second VNFM again until the receiving acknowledgment message sent by the second VNFM is received. Therefore, the second VNFM is prevented from continuously sending the interface establishment request message to the first VNFM because of a message loss.

Further, in this embodiment of the present invention, after a communication interface between the first VNFM and another VNFM is established, the first VNFM may disconnect the established communication interface because of a limitation of the interface establishment policy of the first VNFM.

For example, in the embodiment shown in FIG. 2, because of the limitation of the interface establishment policy of the first VNFM, the first VNFM disconnects the communication interface established between the first VNFM and the second VNFM, the communication interface established between the first VNFM and the third VNFM, the communication interface established between the first VNFM and the fourth VNFM, and the communication interface established between the first VNFM and the fifth VNFM.

Optionally, the first VNFM may receive an interface disconnection request message sent by another VNFM, and disconnect an established communication interface according to the interface disconnection request message.

For example, after the first VNFM sends the interface establishment response message to the second VNFM, that is, after the communication interface between the first VNFM and the second VNFM is successfully established, the second VNFM may disconnect the communication interface because of a limitation of the interface establishment policy of the second VNFM. Therefore, when the second VNFM disconnects the communication interface, the second VNFM sends an interface disconnection request message to the first VNFM.

After the first VNFM receives the interface disconnection request message sent by the second VNFM, the first VNFM disconnects the communication interface according to the interface disconnection request message.

It should be noted that the first VNFM and the second VNFM in this embodiment of the present invention are merely names to distinguish between different VNFMs. In addition, in this embodiment of the present invention, each VNFM in an NFV system may serve as the first VNFM to execute a method that can be executed by the first VNFM, or may serve as the second VNFM to execute a method that can be executed by the second VNFM.

The method for establishing an interface between VNFMs provided in this embodiment of the present invention may include: receiving, by a first VNFM, an interface establishment request message sent by a second VNFM, determining, according to the interface establishment request message and an interface establishment policy of the first VNFM, whether to allow establishment of the communication interface, and if the first VNFM determines to allow establishment of the communication interface, sending, by the first VNFM, an interface establishment response message to the second VNFM, where the interface establishment request message is used to request to establish the communication interface between the first VNFM and the second VNFM, and the interface establishment response message is used to indicate that the communication interface is successfully established. According to the method, after the second VNFM sends the interface establishment request message to the first VNFM, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

Embodiment 3

Figure 5:
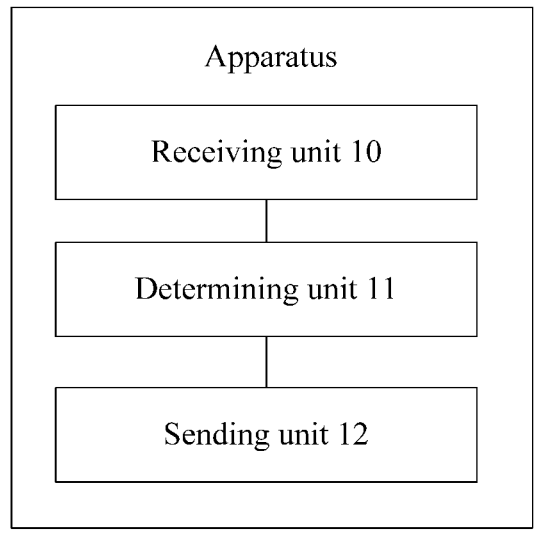
FIG. 5 is a schematic structural diagram of an apparatus according to an embodiment of the present invention.

As shown in FIG. 5, this embodiment of the present invention provides an apparatus. The apparatus may be an entity apparatus of the first VNFM in the embodiment shown in FIG. 2 or FIG. 4, or may be an entity apparatus in which a logical function module that is in an NFV system and that can execute a method procedure that can be executed by the first VNFM is located. The entity apparatus may be individually disposed in the entity apparatus of the first VNFM, or may be an entity apparatus that can communicate with the entity apparatus of the first VNFM. The apparatus may be presented in a form of a chip. The chip carries an application program that can implement the method procedure that can be executed by the first VNFM.

Specifically, the apparatus may include:

a receiving unit 10, configured to receive an interface establishment request message sent by a second VNFM, where the interface establishment request message is used to request to establish a communication interface between the first VNFM and the second VNFM;

a determining unit 11, configured to determine, according to the interface establishment request message received by the receiving unit 10 and an interface establishment policy of the first VNFM, whether to allow establishment of the communication interface; and a sending unit 12, configured to: when the determining unit 11 determines to allow establishment of the communication interface, send an interface establishment response message to the second VNFM, where the interface establishment response message is used to indicate that the communication interface is successfully established.

Optionally, the interface establishment policy of the first VNFM includes a maximum quantity of communication interfaces that are allowed by the first VNFM to be established.

The determining unit 11 is specifically configured to determine, according to the interface establishment request message received by the receiving unit 10, whether a quantity of established communication interfaces of the first VNFM is less than the maximum quantity of communication interfaces that are allowed by the first VNFM to be established.

The determining unit 11 is specifically configured to: when the quantity of established communication interfaces of the first VNFM is less than the maximum quantity of communication interfaces that are allowed by the first VNFM to be established, determine to allow establishment of the communication interface.

The determining unit 11 is specifically configured to: when the quantity of established communication interfaces of the first VNFM is equal to the maximum quantity of communication interfaces that are allowed by the first VNFM to be established, determine not to allow establishment of the communication interface.

Optionally, the interface establishment policy of the first VNFM further includes a priority relationship between VNFMs. The priority relationship is used by the first VNFM to establish a communication interface between the first VNFM and another VNFM.

The determining unit 11 is specifically configured to: when the quantity of established communication interfaces of the first VNFM is equal to the maximum quantity of communication interfaces that are allowed by the first VNFM to be established, obtain a priority of the second VNFM.

The determining unit 11 is specifically configured to determine, according to the priority of the second VNFM, a priority corresponding to the second VNFM in the priority relationship.

The determining unit 11 is specifically configured to determine whether the priority corresponding to the second VNFM in the priority relationship is higher than a priority corresponding to a third VNFM in the priority relationship, where the third VNFM is a VNFM that is corresponding to a lowest priority in the priority relationship and that is in VNFMs that have established a communication interface with the first VNFM.

The determining unit 11 is specifically configured to: when the priority corresponding to the second VNFM in the priority relationship is higher than the priority corresponding to the third VNFM in the priority relationship, determine to allow establishment of the communication interface.

The determining unit 11 is specifically configured to: when the priority corresponding to the second VNFM in the priority relationship is lower than the priority corresponding to the third VNFM in the priority relationship, determine not to allow establishment of the communication interface.

Optionally, the interface establishment policy of the first VNFM includes a maximum quantity of communication interfaces that are allowed by the first VNFM to be established and a first list, the first list includes at least one of a blacklist or a whitelist, the blacklist includes an identity of a VNFM that is not allowed by the first VNFM to establish an interface with the first VNFM, and the whitelist includes an identity of a VNFM that is allowed by the first VNFM to establish an interface with the first VNFM, and the interface establishment request message carries an identity of the second VNFM.

The determining unit 11 is specifically configured to obtain the identity of the second VNFM that is carried in the interface establishment request message.

The determining unit 11 is specifically configured to: when the first list includes at least the whitelist and the whitelist includes the identity of the second VNFM, determine to allow establishment of the communication interface.

The determining unit 11 is specifically configured to: when the first list includes at least the blacklist and the blacklist includes the identity of the second VNFM, determine not to allow establishment of the communication interface.

The determining unit 11 is specifically configured to: when the first list does not include the identity of the second VNFM, determine whether a quantity of established communication interfaces of the first VNFM is less than the maximum quantity of communication interfaces that are allowed by the first VNFM to be established.

The determining unit 11 is specifically configured to: when the quantity of established communication interfaces of the first VNFM is less than the maximum quantity of communication interfaces that are allowed by the first VNFM to be established, determine to allow establishment of the communication interface.

The determining unit 11 is specifically configured to: when the quantity of established communication interfaces of the first VNFM is equal to the maximum quantity of communication interfaces that are allowed by the first VNFM to be established, determine not to allow establishment of the communication interface.

Optionally, the interface establishment policy of the first VNFM further includes a priority relationship between VNFMs. The priority relationship is used by the first VNFM to establish a communication interface between the first VNFM and another VNFM.

The determining unit 11 is specifically configured to: when the quantity of established communication interfaces of the first VNFM is equal to the maximum quantity of communication interfaces that are allowed by the first VNFM to be established, obtain a priority of the second VNFM.

The determining unit 11 is specifically configured to determine, according to the priority of the second VNFM, a priority corresponding to the second VNFM in the priority relationship.

The determining unit 11 is specifically configured to determine whether the priority corresponding to the second VNFM in the priority relationship is higher than a priority corresponding to a fourth VNFM in the priority relationship.

When the first list includes at least the whitelist, the fourth VNFM is a VNFM that is corresponding to a lowest priority in the priority relationship and that is in VNFMs whose identities are not in the whitelist and that have established a communication interface with the first VNFM.

When the first list does not include the whitelist, the fourth VNFM is a VNFM that is corresponding to a lowest priority in the priority relationship and that is in VNFMs that have established a communication interface with the first VNFM.

The determining unit 11 is specifically configured to: when the priority corresponding to the second VNFM in the priority relationship is higher than the priority corresponding to the fourth VNFM in the priority relationship, determine to allow establishment of the communication interface.

The determining unit 11 is specifically configured to: when the priority of the second VNFM in the priority relationship is lower than the priority corresponding to the fourth VNFM in the priority relationship, determine not to allow establishment of the communication interface.

Optionally, the determining unit 11 is specifically configured to obtain the priority of the second VNFM that is carried in the interface establishment request message.

Alternatively, the determining unit 11 is specifically configured to obtain the priority of the second VNFM that is stored in the first VNFM.

Figure 6:
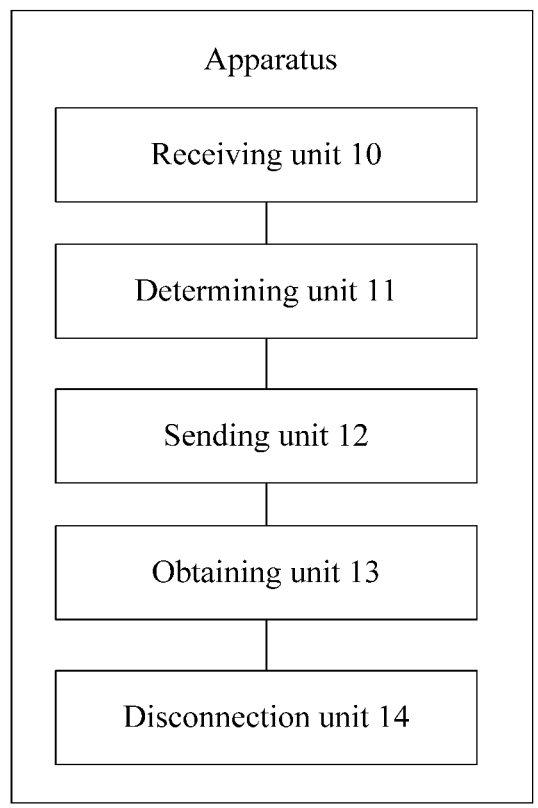
FIG. 6 is a schematic structural diagram of an apparatus according to an embodiment of the present invention.

Optionally, with reference to FIG. 5, as shown in FIG. 6, the apparatus further includes an obtaining unit 13 and a disconnection unit 14.

The obtaining unit 13 is configured to obtain an updated blacklist after the sending unit 12 sends the interface establishment response message to the second VNFM.

The disconnection unit 14 is configured to disconnect the communication interface when it is determined that the updated blacklist obtained by the obtaining unit 13 includes the identity of the second VNFM.

Figure 7:
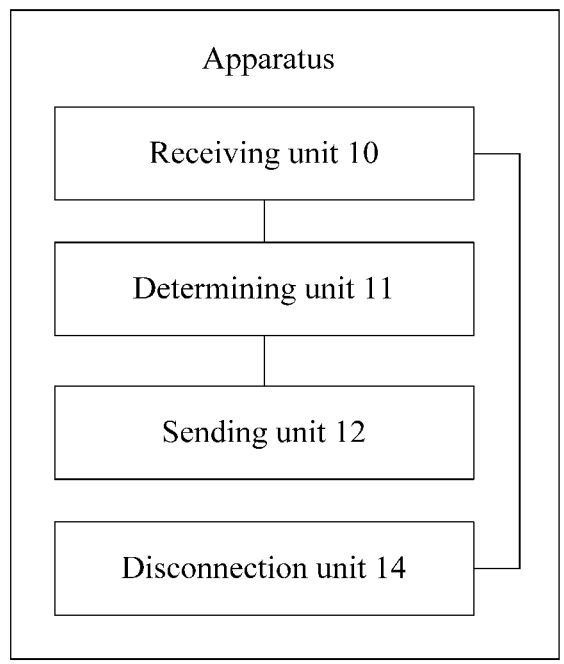
FIG. 7 is a schematic structural diagram of an apparatus according to an embodiment of the present invention.

Optionally, with reference to FIG. 5, as shown in FIG. 7, the apparatus further includes a disconnection unit 14.

The receiving unit 10 is further configured to: after the sending unit 12 sends the interface establishment response message to the second VNFM, receive an interface disconnection request message sent by the second VNFM, where the interface disconnection request message is used to instruct the disconnection unit 14 to disconnect the communication interface.

The disconnection unit 14 is configured to disconnect the communication interface according to the interface disconnection request message received by the receiving unit 10.

Optionally, the sending unit 12 is further configured to: when the determining unit 11 determines not to allow establishment of the communication interface, send an interface establishment rejection message to the second VNFM, where the interface establishment rejection message is used to indicate that establishment of the communication interface fails.

This embodiment of the present invention provides an apparatus. The apparatus can receive an interface establishment request message sent by a second VNFM, determine, according to the interface establishment request message and an interface establishment policy of a first VNFM, whether to allow establishment of the communication interface, and when determining to allow establishment of the communication interface, send an interface establishment response message to the second VNFM, where the interface establishment request message is used to request to establish the communication interface between the first VNFM and the second VNFM, and the interface establishment response message is used to indicate that the communication interface is successfully established. According to the apparatus provided in this embodiment of the present invention, after the second VNFM sends the interface establishment request message to the apparatus, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

Figure 8:
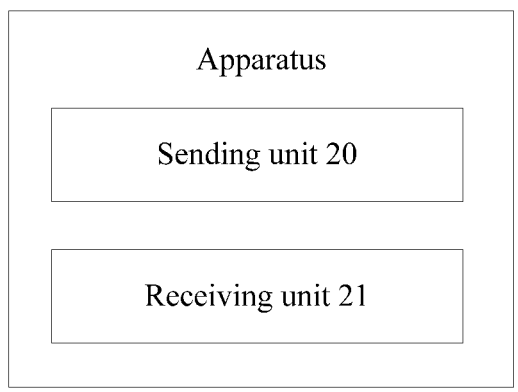
FIG. 8 is a schematic structural diagram of an apparatus according to an embodiment of the present invention.

As shown in FIG. 8, this embodiment of the present invention provides an apparatus. The apparatus may be an entity apparatus in which the second VNFM in the embodiment shown in FIG. 3 or FIG. 5 is located, or may be an entity apparatus in which a logical function module that is in an NFV system and that can execute a method procedure that can be executed by the second VNFM is located. The entity apparatus may be individually disposed in the entity apparatus in which the second VNFM is located, or may be an entity apparatus that can communicate with the entity apparatus in which the second VNFM is located. The apparatus may be presented in a form of a chip. The chip carries an application program that can implement the method procedure that can be executed by the second VNFM.

Specifically, the apparatus may include:

a sending unit 20, configured to send an interface establishment request message to a first VNFM, where the interface establishment request message is used to request to establish a communication interface between the first VNFM and the second VNFM; and a receiving unit 21, configured to receive an interface establishment response message sent by the first VNFM, where the interface establishment response message is used to indicate that the communication interface is successfully established.

Figure 9:
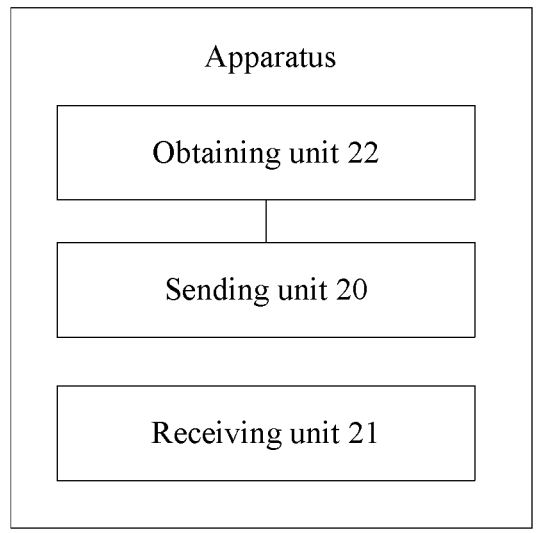
FIG. 9 is a schematic structural diagram of an apparatus according to an embodiment of the present invention.

Optionally, with reference to FIG. 8, as shown in FIG. 9, the apparatus further includes an obtaining unit 22.

The obtaining unit 22 is configured to obtain an attribute of the first VNFM before the sending unit 20 sends the interface establishment request message to the first VNFM, where the attribute of the first VNFM includes at least an identity of the first VNFM, and the attribute of the first VNFM is used by the sending unit 20 to send the interface establishment request message to the first VNFM.

Optionally, the obtaining unit 22 is specifically configured to obtain the attribute of the first VNFM that is stored in the second VNFM.

Figure 10:
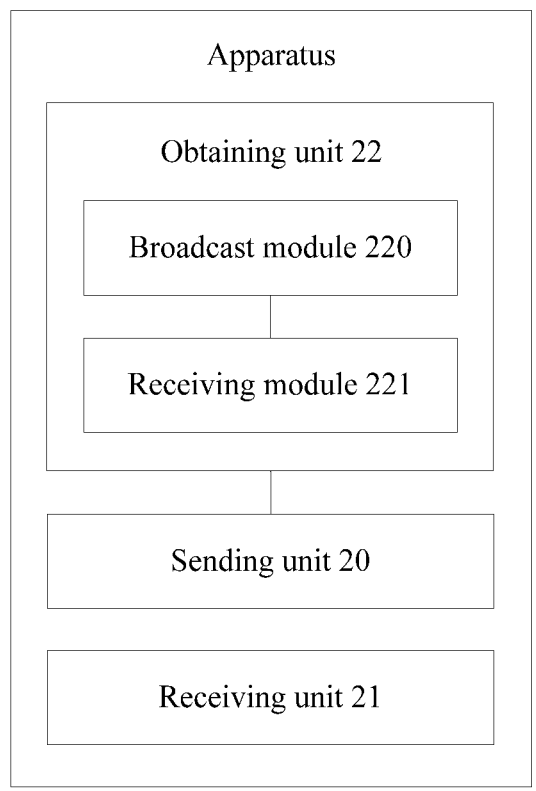
FIG. 10 is a schematic structural diagram of an apparatus according to an embodiment of the present invention.

Optionally, with reference to FIG. 9, as shown in FIG. 10, the obtaining unit 22 includes a broadcast module 220 and a receiving module 221.

The broadcast module 220 is configured to broadcast an identity request message, where the identity request message is used to request an attribute of a VNFM to which the interface establishment request message is to be sent.

The receiving module 221 is configured to receive an identity response message sent by the first VNFM, where the identity response message carries the attribute of the first VNFM.

This embodiment of the present invention provides an apparatus. The apparatus can send an interface establishment request message to a first VNFM, and receive an interface establishment response message sent by the first VNFM, where the interface establishment request message is used to request to establish a communication interface between the first VNFM and a second VNFM, and the interface establishment response message is used to indicate that the communication interface is successfully established. According to the apparatus provided in this embodiment of the present invention, after the interface establishment request message sent by the second VNFM is received, when the first VNFM determines to allow establishment of the communication interface between the first VNFM and the second VNFM, the first VNFM sends the interface establishment response message to the second VNFM, so as to complete establishment of the communication interface, so that the first VNFM and the second VNFM can directly perform information interaction by using the communication interface, thereby improving efficiency of communication between the first VNFM and the second VNFM.

Embodiment 4

Figure 11:
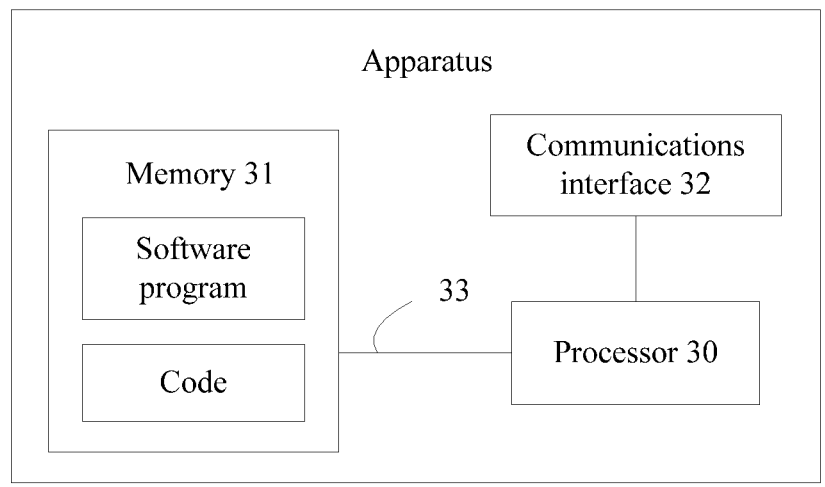
FIG. 11 is a schematic structural diagram of hardware of an apparatus according to an embodiment of the present invention.

As shown in FIG. 11, this embodiment of the present invention provides an apparatus. The apparatus may be an entity apparatus in which the first VNFM in the foregoing embodiment is located, or may be an entity apparatus that can communicate with an entity apparatus in which the first VNFM is located. The apparatus can execute a method procedure that can be executed by the second VNFM. Specifically, the apparatus may include a processor 30, a memory 31, a communication interface 32, and a system bus 33. The processor 30, the memory 31, and the communication interface 32 are connected and complete mutual communication by using the system bus 33.

The processor 30 may be a central processing unit (English: central processing unit, CPU for short), or an application-specific integrated circuit (English: application specific integrated circuit, ASIC for short), or be configured as one or more integrated circuits that implement this embodiment of the present invention.

The memory 31 may include a volatile memory (English: volatile memory), for example, a random-access memory (English: random-access memory, RAM for short). The memory 31 may also include a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short). The memory 31 may further include a combination of the foregoing types of memories.

The communication interface 32 is configured to interact with another node, for example, interact with an NFVO.

When the apparatus runs, the processor 30 and the memory 31 may execute the method procedure shown in FIG. 2 or FIG. 4. This specifically includes the following:

The processor 30 is configured to receive, by using the communication interface 32, an interface establishment request message sent by a second VNFM, determine, according to the interface establishment request message and an interface establishment policy of the first VNFM, whether to allow establishment of a communication interface, and when determining to allow establishment of the communication interface, send an interface establishment response message to the second VNFM by using the communication interface 32, where the interface establishment response message is used to indicate that the communication interface is successfully established, and the interface establishment request message is used to request to establish the communication interface between the first VNFM and the second VNFM.

The memory 31 is configured to store code of the interface establishment request message, code of the interface establishment policy of the first VNFM, the interface establishment response message, and a software program that controls the processor 30 to complete the foregoing process, so that the processor 30 completes the foregoing process by executing the software program and invoking the code of the interface establishment request message, the code of the interface establishment policy of the first VNFM, and the interface establishment response message.

Optionally, the interface establishment policy of the first VNFM includes a maximum quantity of communication interfaces that are allowed by the first VNFM to be established.

The processor 30 is specifically configured to determine, according to the interface establishment request message, whether a quantity of established communication interfaces of the first VNFM is less than the maximum quantity of communication interfaces that are allowed by the first VNFM to be established.

The processor 30 is specifically configured to: when the quantity of established communication interfaces of the first VNFM is less than the maximum quantity of communication interfaces that are allowed by the first VNFM to be established, determine to allow establishment of the communication interface.

The processor 30 is specifically configured to: when the quantity of established communication interfaces of the first VNFM is equal to the maximum quantity of communication interfaces that are allowed by the first VNFM to be established, determine not to allow establishment of the communication interface.

Optionally, the interface establishment policy of the first VNFM further includes a priority relationship between VNFMs. The priority relationship is used by the first VNFM to establish a communication interface between the first VNFM and another VNFM.

The processor 30 is specifically configured to: when the quantity of established communication interfaces of the first VNFM is equal to the maximum quantity of communication interfaces that are allowed by the first VNFM to be established, obtain a priority of the second VNFM.

The processor 30 is specifically configured to determine, according to the priority of the second VNFM, a priority corresponding to the second VNFM in the priority relationship.

The processor 30 is specifically configured to determine whether the priority corresponding to the second VNFM in the priority relationship is higher than a priority corresponding to a third VNFM in the priority relationship. The third VNFM is a VNFM that is corresponding to a lowest priority in the priority relationship and that is in VNFMs that have established a communication interface with the first VNFM.

The processor 30 is specifically configured to: when the priority corresponding to the second VNFM in the priority relationship is higher than the priority corresponding to the third VNFM in the priority relationship, determine to allow establishment of the communication interface.

The processor 30 is specifically configured to: when the priority corresponding to the second VNFM in the priority relationship is lower than the priority corresponding to the third VNFM in the priority relationship, determine not to allow establishment of the communication interface.

Optionally, the interface establishment policy of the first VNFM includes a maximum quantity of communication interfaces that are allowed by the first VNFM to be established and a first list, the first list includes at least one of a blacklist or a whitelist, the blacklist includes an identity of a VNFM that is not allowed by the first VNFM to establish an interface with the first VNFM, and the whitelist includes an identity of a VNFM that is allowed by the first VNFM to establish an interface with the first VNFM, and the interface establishment request message carries an identity of the second VNFM.

The processor 30 is specifically configured to obtain the identity of the second VNFM that is carried in the interface establishment request message.

The processor 30 is specifically configured to: when the first list includes at least the whitelist and the whitelist includes the identity of the second VNFM, determine to allow establishment of the communication interface.

The processor 30 is specifically configured to: when the first list includes at least the blacklist and the blacklist includes the identity of the second VNFM, determine not to allow establishment of the communication interface.

The processor 30 is specifically configured to: when the first list does not include the identity of the second VNFM, determine whether a quantity of established communication interfaces of the first VNFM is less than the maximum quantity of communication interfaces that are allowed by the first VNFM to be established.

The processor 30 is specifically configured to: when the quantity of established communication interfaces of the first VNFM is less than the maximum quantity of communication interfaces that are allowed by the first VNFM to be established, determine to allow establishment of the communication interface.

The processor 30 is specifically configured to: when the quantity of established communication interfaces of the first VNFM is equal to the maximum quantity of communication interfaces that are allowed by the first VNFM to be established, determine not to allow establishment of the communication interface.

Optionally, the interface establishment policy of the first VNFM further includes a priority relationship between VNFMs. The priority relationship is used by the first VNFM to establish a communication interface between the first VNFM and another VNFM.

The processor 30 is specifically configured to: when the quantity of established communication interfaces of the first VNFM is equal to the maximum quantity of communication interfaces that are allowed by the first VNFM to be established, obtain a priority of the second VNFM.

The processor 30 is specifically configured to determine, according to the priority of the second VNFM, a priority corresponding to the second VNFM in the priority relationship.

The processor 30 is specifically configured to determine whether the priority corresponding to the second VNFM in the priority relationship is higher than a priority corresponding to a fourth VNFM in the priority relationship.

When the first list includes at least the whitelist, the fourth VNFM is a VNFM that is corresponding to a lowest priority in the priority relationship and that is in VNFMs whose identities are not in the whitelist and that have established a communication interface with the first VNFM.

When the first list does not include the whitelist, the fourth VNFM is a VNFM that is corresponding to a lowest priority in the priority relationship and that is in VNFMs that have established a communication interface with the first VNFM.

The processor 30 is specifically configured to: when the priority corresponding to the second VNFM in the priority relationship is higher than the priority corresponding to the fourth VNFM in the priority relationship, determine to allow establishment of the communication interface.

The processor 30 is specifically configured to: when the priority of the second VNFM in the priority relationship is lower than the priority corresponding to the fourth VNFM in the priority relationship, determine not to allow establishment of the communication interface.

Optionally, the processor 30 is specifically configured to obtain the priority of the second VNFM that is carried in the interface establishment request message.

Alternatively, the processor 30 is specifically configured to obtain the priority of the second VNFM that is stored in the first VNFM.

Optionally, the processor 30 is further configured to obtain an updated blacklist after sending the interface establishment response message to the second VNFM.

The processor 30 is further configured to disconnect the communication interface when determining that the updated blacklist includes the identity of the second VNFM.

Optionally, the processor 30 is further configured to: after sending the interface establishment response message to the second VNFM, receive an interface disconnection request message sent by the second VNFM, where the interface disconnection request message is used to instruct the processor 30 to disconnect the communication interface.

The processor 30 is further configured to disconnect the communication interface according to the interface disconnection request message.

With reference to any one of the fifth aspect or the first possible implementation of the fifth aspect to the fifth possible implementation of the fifth aspect, in an eighth possible implementation, the processor 30 is further configured to: when determining not to allow establishment of the communication interface, send an interface establishment rejection message to the second VNFM, where the interface establishment rejection message is used to indicate that establishment of the communication interface fails.

This embodiment of the present invention provides an apparatus. The apparatus can receive an interface establishment request message sent by a second VNFM, determine, according to the interface establishment request message and an interface establishment policy of a first VNFM, whether to allow establishment of the communication interface, and when determining to allow establishment of the communication interface, send an interface establishment response message to the second VNFM, where the interface establishment request message is used to request to establish the communication interface between the first VNFM and the second VNFM, and the interface establishment response message is used to indicate that the communication interface is successfully established. According to the apparatus provided in this embodiment of the present invention, after the second VNFM sends the interface establishment request message to the apparatus, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

Figure 12:
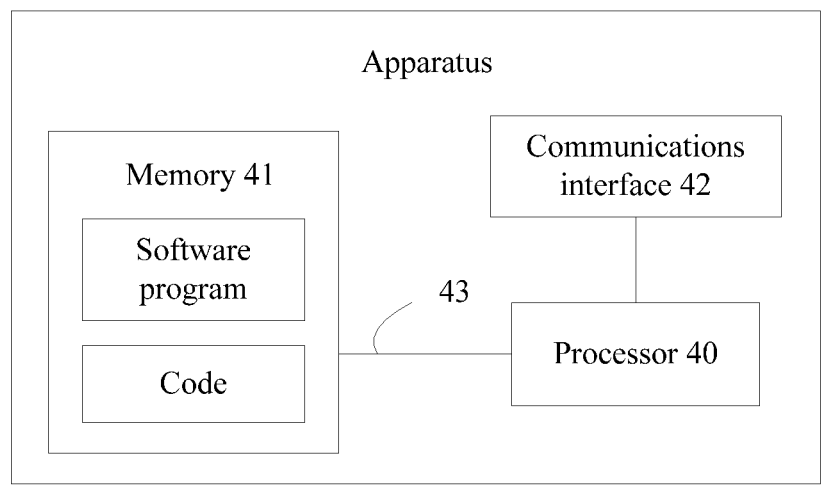
FIG. 12 is a schematic structural diagram of hardware of an apparatus according to an embodiment of the present invention.

As shown in FIG. 12, this embodiment of the present invention provides an apparatus. The apparatus may be an entity apparatus in which the second VNFM in the foregoing embodiment is located, or may be an entity apparatus that can communicate with an entity apparatus in which the second VNFM is located. The apparatus can execute a method procedure that can be executed by the second VNFM. Specifically, the apparatus may include a processor 40, a memory 41, a communication interface 42, and a system bus 43. The processor 40, the memory 41, and the communication interface 42 are connected and complete mutual communication by using the system bus 43.

The processor 40 may be a CPU, or an ASIC, or be configured as one or more integrated circuits that implement this embodiment of the present invention.

The memory 41 may include a volatile memory, for example, a RAM. The memory 41 may also include a non-volatile memory, for example, a ROM, a flash memory, an HDD, or an SSD. The memory 41 may further include a combination of the foregoing types of memories.

The communication interface 42 is configured to interact with another node, for example, interact with an NFVO.

When the apparatus runs, the processor 40 and the memory 41 may execute the method procedure shown in FIG. 3 or FIG. 4. This specifically includes the following:

The processor 40 is configured to send, by using the communication interface 42, an interface establishment request message to a first VNFM, and receive, by using the communication interface 42, an interface establishment response message sent by the first VNFM, where the interface establishment request message is used to request to establish a communication interface between the first VNFM and the second VNFM, and the interface establishment response message is used to indicate that the communication interface is successfully established.

The memory 41 is configured to store code of the interface establishment request message, code of the interface establishment response message, and a software program that controls the processor 40 to complete the foregoing process, so that the processor completes the foregoing process by executing the software program and invoking the code of the interface establishment response message and the code of the interface establishment request message.

Optionally, the processor 40 is configured to obtain an attribute of the first VNFM before sending the interface establishment request message to the first VNFM, where the attribute of the first VNFM includes at least an identity of the first VNFM, and the attribute of the first VNFM is used to send the interface establishment request message to the first VNFM.

Optionally, the processor 40 is specifically configured to obtain the attribute of the first VNFM that is stored in the second VNFM.

Optionally, the processor 40 is specifically configured to broadcast an identity request message, where the identity request message is used to request an attribute of a VNFM to which the interface establishment request message is to be sent.

The processor 40 is specifically configured to receive an identity response message sent by the first VNFM, where the identity response message carries the attribute of the first VNFM.

This embodiment of the present invention provides an apparatus. The apparatus can send an interface establishment request message to a first VNFM, and receive an interface establishment response message sent by the first VNFM, where the interface establishment request message is used to request to establish a communication interface between the first VNFM and a second VNFM, and the interface establishment response message is used to indicate that the communication interface is successfully established. According to the apparatus provided in this embodiment of the present invention, after the interface establishment request message sent by the second VNFM is received, when the first VNFM determines to allow establishment of the communication interface between the first VNFM and the second VNFM, the first VNFM sends the interface establishment response message to the second VNFM, so as to complete establishment of the communication interface, so that the first VNFM and the second VNFM can directly perform information interaction by using the communication interface, thereby improving efficiency of communication between the first VNFM and the second VNFM.

Embodiment 5

Figure 13:
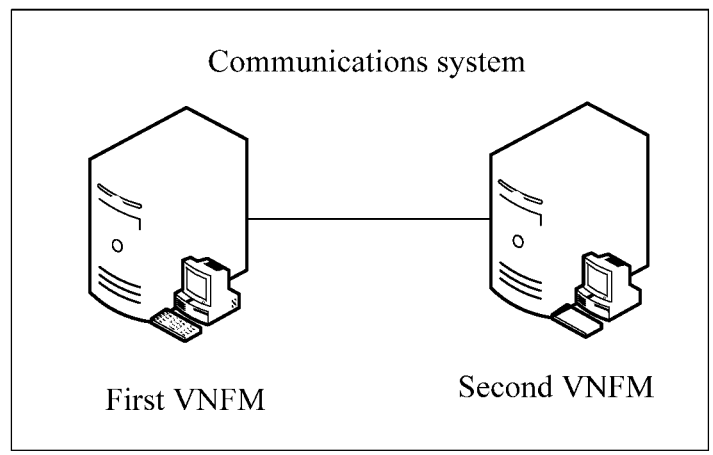
FIG. 13 shows a communications system according to an embodiment of the present invention.

As shown in FIG. 13, this embodiment of the present invention provides a communications system. The communications system may include any one of the apparatuses shown in FIG. 5 to FIG. 7 and any one of the apparatuses shown in FIG. 8 to FIG. 10. Alternatively, the communications system may include the apparatus shown in FIG. 11 and the apparatus shown in FIG. 12.

Any one of the apparatuses shown in FIG. 5 to FIG. 7 and the apparatus shown in FIG. 11 may be referred to as a first VNFM, and any one of the apparatuses shown in FIG. 8 to FIG. 10 and the apparatus shown in FIG. 12 may be referred to as a second VNFM.

In this embodiment of the present invention, the first VNFM can receive an interface establishment request message sent by the second VNFM, determine, according to the interface establishment request message and an interface establishment policy of the first VNFM, whether to allow establishment of the communication interface, and when determining to allow establishment of the communication interface, send an interface establishment response message to the second VNFM; and the second VNFM can send the interface establishment request message to the first VNFM, and receive the interface establishment response message sent by the first VNFM. The interface establishment request message is used to request to establish the communication interface between the first VNFM and the second VNFN. The interface establishment response message is used to indicate that the communication interface is successfully established.

It may be understood that the first VNFM in the communications system provided in this embodiment of the present invention can execute the method for establishing an interface between VNFMs that is shown in FIG. 2 or FIG. 4. For specific functions of modules or components in the VNFM and a procedure of executing the method, refer to description in the embodiment shown in FIG. 2 or FIG. 4, and details are not described herein.

The second VNFM in the communications system provided in this embodiment of the present invention can execute the method for establishing an interface between VNFMs that is shown in FIG. 3 or FIG. 4. For specific functions of modules or components in the VNFM and a procedure of executing the method, refer to description in the embodiment shown in FIG. 3 or FIG. 4, and details are not described herein.

According to the communications system provided in this embodiment of the present invention, a second VNFM can send an interface establishment request message to a first VNFM, after receiving the interface establishment request message sent by the second VNFM, the first VNFM can determine, according to the interface establishment request message and an interface establishment policy of the first VNFM, whether to allow establishment of the communication interface, when determining to allow establishment of the communication interface, the first VNFM sends an interface establishment response message to the second VNFM, and after the second VNFM receives the interface establishment response message sent by the first VNFM, it indicates that the communication interface is successfully established. The interface establishment request message is used to request to establish the communication interface between the first VNFM and the second VNFM. That is, after the second VNFM sends the interface establishment request message to the first VNFM, the communication interface between the first VNFM and the second VNFM can be established with permission from the first VNFM, so that the first VNFM and the second VNFM can directly communicate by using the communication interface, thereby improving efficiency of communication between the first VNFM and the second VNFM.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (English full name: Read-Only Memory, ROM for short), a random access memory (English full name: Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing an interface between virtualized network function managers (VNFMs), comprising:
receiving, by a first VNFM, an interface establishment request message sent by a second VNFM, wherein the interface establishment request message is used to request to establish a communication interface between the first VNFM and the second VNFM;
determining, by the first VNFM according to the interface establishment request message and an interface establishment policy of the first VNFM, whether to allow establishment of the communication interface, wherein the interface establishment policy of the first VNFM comprises a first list comprising at least one of a blacklist or a whitelist, the blacklist comprises an identity of a VNFM that is not allowed by the first VNFM to establish an interface with the first VNFM, and the whitelist comprises an identity of a VNFM that is allowed by the first VNFM to establish an interface with the first VNFM, and the interface establishment request message carries an identity of the second VNFM, and the determining, by the first VNFM according to the interface establishment request message and an interface establishment policy of the first VNFM, whether to allow establishment of the communication interface comprises:
obtaining, by the first VNFM, the identity of the second VNFM that is carried in the interface establishment request message; and
when the first list comprises at least the whitelist and the whitelist comprises the identity of the second VNFM, determining, by the first VNFM, to allow establishment of the communication interface; or
when the first list comprises at least the blacklist and the blacklist comprises the identity of the second VNFM, determining, by the first VNFM, not to allow establishment of the communication interface; and
when the first VNFM determines to allow establishment of the communication interface, sending, by the first VNFM, an interface establishment response message to the second VNFM, wherein the interface establishment response message is used to indicate that the communication interface is successfully established; and
wherein the interface establishment policy of the first VNFM comprises a maximum quantity of communication interfaces that are allowed by the first VNFM to be established; and
determining, by the first VNFM according to the interface establishment request message and an interface establishment policy of the first VNFM, whether to allow establishment of the communication interface comprises:
when the first list does not comprise the identity of the second VNFM, determining, by the first VNFM, whether a quantity of established communication interfaces of the first VNFM is less than the maximum quantity of communication interfaces that are allowed by the first VNFM to be established; and
determining, by the first VNFM, to allow establishment of the communication interface, when the quantity of established communication interfaces of the first VNFM is less than the maximum quantity of communication interfaces that are allowed by the first VNFM to be established; or
determining, by the first VNFM, not to allow establishment of the communication interface, when the quantity of established communication interfaces of the first VNFM is equal to the maximum quantity of communication interfaces that are allowed by the first VNFM to be established.

2. The method according to claim 1, wherein the interface establishment policy of the first VNFM comprises a maximum quantity of communication interfaces that are allowed by the first VNFM to be established; and
the determining, by the first VNFM according to the interface establishment request message and an interface establishment policy of the first VNFM, whether to allow establishment of the communication interface comprises:
determining, by the first VNFM according to the interface establishment request message, whether a quantity of established communication interfaces of the first VNFM is less than the maximum quantity of communication interfaces that are allowed by the first VNFM to be established; and
determining, by the first VNFM, to allow establishment of the communication interface, when the quantity of established communication interfaces of the first VNFM is less than the maximum quantity of communication interfaces that are allowed by the first VNFM to be established; or
determining, by the first VNFM, not to allow establishment of the communication interface, when the quantity of established communication interfaces of the first VNFM is equal to the maximum quantity of communication interfaces that are allowed by the first VNFM to be established.

3. The method according to claim 2, wherein the interface establishment policy of the first VNFM further comprises a priority relationship between VNFMs, and the priority relationship is used by the first VNFM to establish a communication interface between the first VNFM and another VNFM; and
the determining, by the first VNFM, not to allow establishment of the communication interface, when the quantity of established communication interfaces of the first VNFM is equal to the maximum quantity of communication interfaces that are allowed by the first VNFM to be established comprises:
when the quantity of established communication interfaces of the first VNFM is equal to the maximum quantity of communication interfaces that are allowed by the first VNFM to be established, obtaining, by the first VNFM, a priority of the second VNFM;
determining, by the first VNFM according to the priority of the second VNFM, a priority corresponding to the second VNFM in the priority relationship;
determining, by the first VNFM, whether the priority corresponding to the second VNFM in the priority relationship is higher than a priority corresponding to a third VNFM in the priority relationship, wherein the third VNFM is a VNFM that is corresponding to a lowest priority in the priority relationship and that is in VNFMs that have established a communication interface with the first VNFM; and
when the first VNFM determines that the priority corresponding to the second VNFM in the priority relationship is higher than the priority corresponding to the third VNFM in the priority relationship, determining, by the first VNFM, to allow establishment of the communication interface; or
when the first VNFM determines that the priority corresponding to the second VNFM in the priority relationship is lower than the priority corresponding to the third VNFM in the priority relationship, determining, by the first VNFM, not to allow establishment of the communication interface.

4. The method according to claim 1, wherein the interface establishment policy of the first VNFM further comprises a priority relationship between VNFMs, and the priority relationship is used by the first VNFM to establish a communication interface between the first VNFM and another VNFM; and
determining, by the first VNFM, not to allow establishment of the communication interface, when the quantity of established communication interfaces of the first VNFM is equal to the maximum quantity of communication interfaces that are allowed by the first VNFM to be established comprises:
when the quantity of established communication interfaces of the first VNFM is equal to the maximum quantity of communication interfaces that are allowed by the first VNFM to be established, obtaining, by the first VNFM, a priority of the second VNFM;

determining, by the first VNFM according to the priority of the second VNFM, a priority corresponding to the second VNFM in the priority relationship;

determining, by the first VNFM, whether the priority corresponding to the second VNFM in the priority relationship is higher than a priority corresponding to a fourth VNFM in the priority relationship; wherein when the first list comprises at least the whitelist, the fourth VNFM is a VNFM that is corresponding to a lowest priority in the priority relationship and that is in VNFMs whose identities are not in the whitelist and that have established a communication interface with the first VNFM; or when the first list does not comprise the whitelist, the fourth VNFM is a VNFM that is corresponding to a lowest priority in the priority relationship and that is in VNFMs that have established a communication interface with the first VNFM; and when the first VNFM determines that the priority corresponding to the second VNFM in the priority relationship is higher than the priority corresponding to the fourth VNFM in the priority relationship, determining, by the first VNFM, to allow establishment of the communication interface; or when the first VNFM determines that the priority of the second VNFM in the priority relationship is lower than the priority corresponding to the fourth VNFM in the priority relationship, determining, by the first VNFM, not to allow establishment of the communication interface.

5. The method according to claim 3, wherein the obtaining, by the first VNFM, a priority of the second VNFM comprises:

obtaining, by the first VNFM, the priority of the second VNFM that is carried in the interface establishment request message; or obtaining, by the first VNFM, the priority of the second VNFM that is stored in the first VNFM.

6. The method according to claim 1, wherein after sending, by the first VNFM, the interface establishment response message to the second VNFM, the method further comprises:

obtaining, by the first VNFM, an updated blacklist; and when the first VNFM determines that the updated blacklist comprises the identity of the second VNFM, disconnecting, by the first VNFM, the communication interface.

7. The method according to claim 1, wherein after the sending, by the first VNFM, an interface establishment response message to the second VNFM, the method further comprises:

receiving, by the first VNFM, an interface disconnection request message sent by the second VNFM, wherein the interface disconnection request message is used to instruct the first VNFM to disconnect the communication interface; and disconnecting, by the first VNFM, the communication interface according to the interface disconnection request message.

8. The method according to claim 1, wherein after the determining, by the first VNFM according to the interface establishment request message and an interface establishment policy of the first VNFM, whether to allow establishment of the communication interface, the method further comprises:

when the first VNFM determines not to allow establishment of the communication interface, sending, by the first VNFM, an interface establishment rejection message to the second VNFM, wherein the interface establishment rejection message is used to indicate that establishment of the communication interface fails.

9. An apparatus, comprising:

a memory to store instructions; and a processor to execute the instructions to cause the apparatus to:

receive an interface establishment request message from a second VNFM, wherein the interface establishment request message is used to request to establish a communication interface between a first VNFM and the second VNFM;

determine, according to the interface establishment request message received by the apparatus and an interface establishment policy of the first VNFM, whether to allow establishment of the communication interface, wherein the interface establishment policy of the first VNFM comprises a first list comprising at least one of a blacklist or a whitelist, the blacklist comprises an identity of a VNFM that is not allowed by the first VNFM to establish an interface with the first VNFM, and the whitelist comprises an identity of a VNFM that is allowed by the first VNFM to establish an interface with the first VNFM, and the interface establishment request message carries an identity of the second VNFM; and the determine according to the interface establishment request message and an interface establishment policy of the first VNFM, whether to allow establishment of the communication interface comprises:

obtain the identity of the second VNFM that is carried in the interface establishment request message; and when the first list comprises at least the whitelist and the whitelist comprises the identity of the second VNFM, determine to allow establishment of the communication interface; or when the first list comprises at least the blacklist and the blacklist comprises the identity of the second VNFM, determine not to allow establishment of the communication interface; and when the apparatus determines to allow establishment of the communication interface, send an interface establishment response message to the second VNFM, wherein the interface establishment response message is used to indicate that the communication interface is successfully established and, wherein the interface establishment policy of the first VNFM comprises a maximum quantity of communication interfaces that are allowed by the first VNFM to be established;

the apparatus is configured to: when the first list does not comprise the identity of the second VNFM, determine whether a quantity of established communication interfaces of the first VNFM is less than the maximum quantity of communication interfaces that are allowed by the first VNFM to be established;

the apparatus is configured to: determine to allow establishment of the communication interface, when the quantity of established communication interfaces of the first VNFM is less than the maximum quantity of communication interfaces that are allowed by the first VNFM to be established; and the apparatus is configured to: determine not to allow establishment of the communication interface, when the quantity of established communication interfaces of the first VNFM is equal to the maximum quantity of communication interfaces that are allowed by the first VNFM to be established.

10. The apparatus according to claim 9, wherein the interface establishment policy of the first VNFM comprises a maximum quantity of communication interfaces that are allowed by the first VNFM to be established;
the apparatus is configured to determine, according to the interface establishment request message received by the apparatus, whether a quantity of established communication interfaces of the first VNFM is less than the maximum quantity of communication interfaces that are allowed by the first VNFM to be established; and
the apparatus is configured to: determine to allow establishment of the communication interface, when the quantity of established communication interfaces of the first VNFM is less than the maximum quantity of communication interfaces that are allowed by the first VNFM to be established; or
the apparatus is configured to: determine not to allow establishment of the communication interface, when the quantity of established communication interfaces of the first VNFM is equal to the maximum quantity of communication interfaces that are allowed by the first VNFM to be established.

11. The apparatus according to claim 10, wherein the interface establishment policy of the first VNFM further comprises a priority relationship between VNFMs, and the priority relationship is used by the first VNFM to establish a communication interface between the first VNFM and another VNFM;
the apparatus is configured to: when the quantity of established communication interfaces of the first VNFM is equal to the maximum quantity of communication interfaces that are allowed by the first VNFM to be established, obtain a priority of the second VNFM;
the apparatus is configured to determine, according to the priority of the second VNFM, a priority corresponding to the second VNFM in the priority relationship;
the apparatus is configured to determine whether the priority corresponding to the second VNFM in the priority relationship is higher than a priority corresponding to a third VNFM in the priority relationship, wherein the third VNFM is a VNFM that is corresponding to a lowest priority in the priority relationship and that is in VNFMs that have established a communication interface with the first VNFM; and
the apparatus is configured to: when the priority corresponding to the second VNFM in the priority relationship is higher than the priority corresponding to the third VNFM in the priority relationship, determine to allow establishment of the communication interface; or
the apparatus is configured to: when the priority corresponding to the second VNFM in the priority relationship is lower than the priority corresponding to the third VNFM in the priority relationship, determine not to allow establishment of the communication interface.

12. The apparatus according to claim 9, wherein the interface establishment policy of the first VNFM further comprises a priority relationship between VNFMs, and the priority relationship is used by the first VNFM to establish a communication interface between the first VNFM and another VNFM;
the apparatus is configured to: when the quantity of established communication interfaces of the first VNFM is equal to the maximum quantity of communication interfaces that are allowed by the first VNFM to be established, obtain a priority of the second VNFM;
the apparatus is configured to determine, according to the priority of the second VNFM, a priority corresponding to the second VNFM in the priority relationship;
the apparatus is configured to determine whether the priority corresponding to the second VNFM in the priority relationship is higher than a priority corresponding to a fourth VNFM in the priority relationship; wherein
when the first list comprises at least the whitelist, the fourth VNFM is a VNFM that is corresponding to a lowest priority in the priority relationship and that is in VNFMs whose identities are not in the whitelist and that have established a communication interface with the first VNFM; or
when the first list does not comprise the whitelist, the fourth VNFM is a VNFM that is corresponding to a lowest priority in the priority relationship and that is in VNFMs that have established a communication interface with the first VNFM; and
the apparatus is configured to: when the priority corresponding to the second VNFM in the priority relationship is higher than the priority corresponding to the fourth VNFM in the priority relationship, determine to allow establishment of the communication interface; or
the apparatus is configured to: when the priority of the second VNFM in the priority relationship is lower than the priority corresponding to the fourth VNFM in the priority relationship, determine not to allow establishment of the communication interface.

13. The apparatus according to claim 11, wherein
the apparatus is configured to obtain the priority of the second VNFM that is carried in the interface establishment request message; or
the apparatus is configured to obtain the priority of the second VNFM that is stored in the first VNFM.

14. The apparatus according to claim 9, wherein the apparatus is configured to obtain an updated blacklist after the apparatus sends the interface establishment response message to the second VNFM; and
disconnect the communication interface when the updated blacklist obtained by the apparatus comprises the identity of the second VNFM.

15. The apparatus according to claim 9, wherein the apparatus
is further configured to: after the apparatus sends the interface establishment response message to the second VNFM, receive an interface disconnection request message sent by the second VNFM, wherein the interface disconnection request message is used to instruct the apparatus to disconnect the communication interface; and
disconnect the communication interface according to the interface disconnection request message received by the apparatus.

16. The apparatus according to claim 9, wherein
the apparatus is further configured to: when the apparatus determines not to allow establishment of the communication interface, send an interface establishment rejection message to the second VNFM, wherein the interface establishment rejection message is used to indicate that establishment of the communication interface fails.

17. A communications system, comprising:
an apparatus comprising:

a memory to store instructions; and
a processor to execute the instructions to cause the apparatus to:
receive an interface establishment request message from a second VNFM, wherein the interface establishment request message is used to request to establish a communication interface between a first VNFM and the second VNFM;
determine, according to the interface establishment request message received by the apparatus and an interface establishment policy of the first VNFM, whether to allow establishment of the communication interface, wherein the interface establishment policy of the first VNFM comprises a first list comprising at least one of a blacklist or a whitelist, the blacklist comprises an identity of a VNFM that is not allowed by the first VNFM to establish an interface with the first VNFM, and the whitelist comprises an identity of a VNFM that is allowed by the first VNFM to establish an interface with the first VNFM, and the interface establishment request message carries an identity of the second VNFM; and
the determine according to the interface establishment request message and an interface establishment policy of the first VNFM, whether to allow establishment of the communication interface comprises:
obtain the identity of the second VNFM that is carried in the interface establishment request message; and
when the first list comprises at least the whitelist and the whitelist comprises the identity of the second VNFM, determine to allow establishment of the communication interface; or
when the first list comprises at least the blacklist and the blacklist comprises the identity of the second VNFM, determine not to allow establishment of the communication interface; and when the apparatus determines to allow establishment of the communication interface, send an interface establishment response message to the second VNFM, wherein the interface establishment response message is used to indicate that the communication interface is successfully established; and wherein the interface establishment policy of the first VNFM comprises a maximum quantity of communication interfaces that are allowed by the first VNFM to be established; and
determining, by the first VNFM according to the interface establishment request message and an interface establishment policy of the first VNFM, whether to allow establishment of the communication interface comprises:
when the first list does not comprise the identity of the second VNFM, determining, by the first VNFM, whether a quantity of established communication interfaces of the first VNFM is less than the maximum quantity of communication interfaces that are allowed by the first VNFM to be established; and
determining, by the first VNFM, to allow establishment of the communication interface, when the quantity of established communication interfaces of the first VNFM is less than the maximum quantity of communication interfaces that are allowed by the first VNFM to be established; or
determining, by the first VNFM, not to allow establishment of the communication interface, when the quantity of established communication interfaces of the first VNFM is equal to the maximum quantity of communication interfaces that are allowed by the first VNFM to be established.

* * * * *